(12) United States Patent
Mushikabe et al.

(10) Patent No.: US 7,623,146 B2
(45) Date of Patent: Nov. 24, 2009

(54) OPTICAL DISC IMAGE DRAWING METHOD, OPTICAL DISC IMAGE DRAWING PROGRAM, AND OPTICAL DISC IMAGE DRAWING SYSTEM

(75) Inventors: Kazuya Mushikabe, Hamamatsu (JP); Hisanori Itoga, Hamamatsu (JP); Tatsuo Fushiki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 11/785,048

(22) Filed: Apr. 13, 2007

(65) Prior Publication Data
US 2007/0279664 A1   Dec. 6, 2007

(30) Foreign Application Priority Data
Apr. 13, 2006   (JP)   ............................. 2006-110770

(51) Int. Cl.
*B41J 2/435* (2006.01)
(52) U.S. Cl. ...................................... 347/224
(58) Field of Classification Search ......... 347/224–225; 382/238
See application file for complete search history.

(56) References Cited

U.S. PATENT DOCUMENTS

| 5,701,282 | A |   | 12/1997 | Matsumoto et al. |
| 6,078,693 | A | * | 6/2000 | Kawamura et al. ........... 382/238 |
| 6,486,968 | B2 |   | 11/2002 | Nishikawa |
| 7,082,094 | B2 |   | 7/2006 | Morishima et al. |
| 2001/0026531 | A1 |   | 10/2001 | Onodera et al. |
| 2002/0191517 | A1 |   | 12/2002 | Honda et al. |
| 2004/0001411 | A1 |   | 1/2004 | Morishima |
| 2004/0057356 | A1 |   | 3/2004 | Morishima |

FOREIGN PATENT DOCUMENTS

| JP | 6-284370 A | 10/1994 |
| JP | 10-333846 A | 12/1998 |
| JP | 11-025636 | 1/1999 |
| JP | 2000-224403 | 8/2000 |
| JP | 2001-6223 A | 1/2001 |
| JP | 2002-203321 A | 7/2002 |
| JP | 2003-051118 A | 2/2003 |

(Continued)

OTHER PUBLICATIONS

European Search Report dated Oct. 22, 2007 (Eight (8) pages).

(Continued)

*Primary Examiner*—Hai C Pham
(74) *Attorney, Agent, or Firm*—Crowell & Moring LLP

(57) ABSTRACT

A pertinent amount of Image data of an image to be drawn on a surface of an optical disc is intermittently transmitted from a computer to an optical disc image drawing apparatus. The optical disc image drawing apparatus stores the transmitted image in a buffer memory and successively reads the stored image data in a constant speed to performing the drawing operation on the surface of the optical disc. The computer counts the total amount of image data of transmission is completed and calculates a drawing radial position, which corresponds to the counted total amount with a currently drawing radial position. The computer displays a picture of the drawing image on a display so that the currently drawing radial position calculated above can be visually recognized.

10 Claims, 16 Drawing Sheets

FOREIGN PATENT DOCUMENTS

| | | |
|---|---|---|
| JP | 2003-203348 A | 7/2003 |
| JP | 2004-5848 A | 1/2004 |
| JP | 2004-355764 A | 12/2004 |
| JP | 2005-317202 | 11/2005 |
| WO | WO 2006/021897 A1 | 3/2006 |

OTHER PUBLICATIONS

Japanese Office Action dated Sep. 9, 2008 with English translation (Six (6) pages).

Japanese Office Action dated May 21, 2009 in Japanese Patent Application No. 2006-110770.

* cited by examiner

FIG. 16
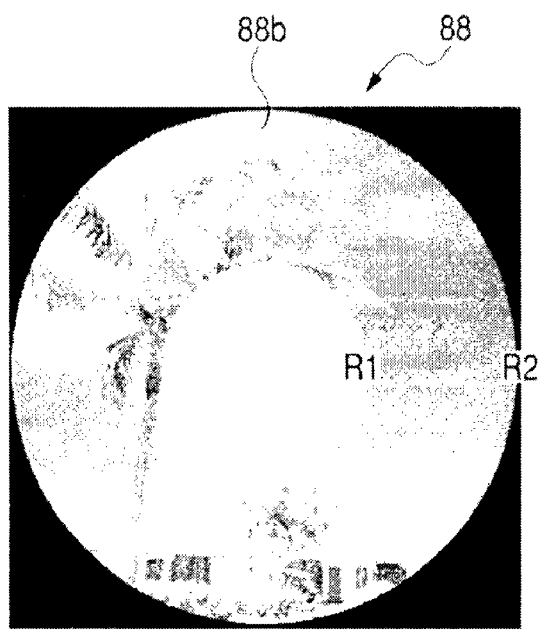
(I) DRAWING START
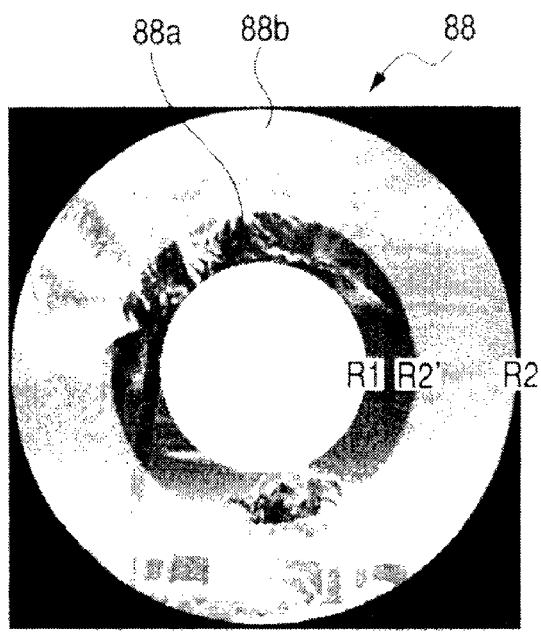
(II) DRAWING (20%)
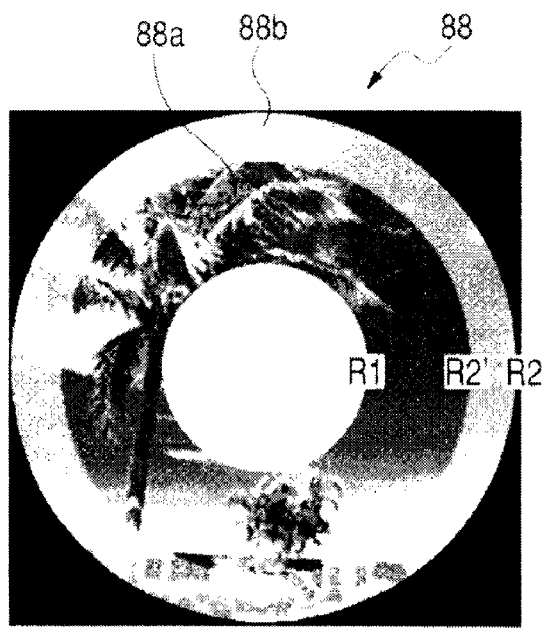
(III) DRAWING (75%)
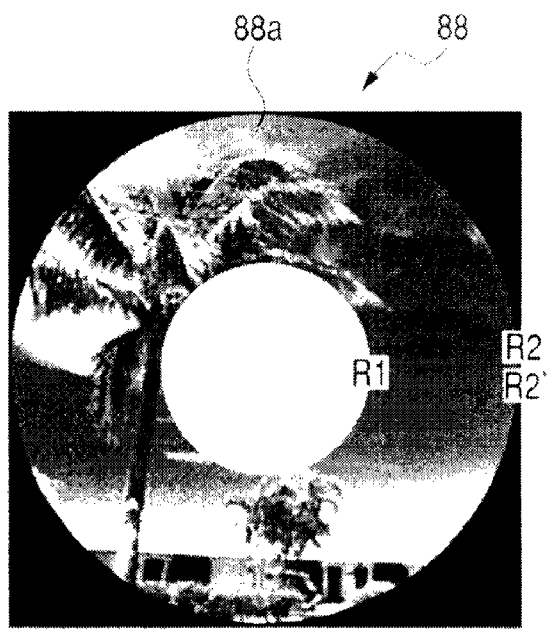
(IV) DRAWING END

OPTICAL DISC IMAGE DRAWING METHOD, OPTICAL DISC IMAGE DRAWING PROGRAM, AND OPTICAL DISC IMAGE DRAWING SYSTEM

BACKGROUND OF THE INVENTION

The present invention relates to an optical disc image drawing method, an optical disc image drawing program, and an optical disc image drawing system for drawing a visible image in accordance with image data onto a surface of an optical disc by transmitting the image data to an optical disc apparatus from a computer. In the present invention, when a drawing operation is performed, the progress of the drawing operation is displayed on a display for a user to easily know the progress.

Patent Document 1 and Patent Document 2 disclose a technology that a drawing layer including a thermosensitive layer and a photosensitive layer is drawn on a label surface of an optical disc such as a recordable CD and a recordable DVD, an optical disc recording apparatus recording data on a data recording layer of the optical disc serves as an optical disc image drawing apparatus, a laser beam modulated in accordance with image data is irradiated onto the drawing layer from an optical pick-up, and a visible image is drawn on the drawing layer. Patent Document 3 discloses a technology that a pit is formed by irradiating the laser beam modulated in accordance with the image data onto the data recording layer of the optical disc and the visible image is drawn in stead of recording the data on the data recording layer.

Patent Document 1: JP2002-203321A
Patent Document 2: JP2004-5848A
Patent Document 3: JP2004-355764A The drawing of an image on an optical disc is a time-consuming process. It is convenient for a user to display the progress of the drawing on a display during the drawing is performed. In application software for the optical disc image drawing, which has been commercialized in the past, generally, the progress of the drawing during performing the drawing is displayed in a progress bar as shown in FIG. 2 or time left for the drawing is displayed in numerical information on a sub window. However, in the known display method, the user could not know to which part of a drawn image the drawing is progressed.

SUMMARY OF THE INVENTION

The present invention is made to solve the problem and to provide an optical disc image drawing method and an optical disc image drawing program allowing the user to easily recognize to which part of the drawn image the drawing is progressed at the time of drawing.

In order to solve the above object, the present invention has the following arrangement.

(1) An optical disc image drawing method comprising:

providing an optical disc image drawing apparatus, a computer, a display, and an optical disc in which a visible image can be drawn onto a surface thereof;

loading the optical disc onto the optical disc image drawing apparatus;

transmitting image data of the visible image to be drawn on the optical disc from the computer to the optical disk image drawing apparatus, sequentially;

while the optical disk image drawing apparatus receives the image data transmitted from the computer, rotating the optical disc by the optical disk image drawing apparatus, moving an optical head in a disc diameter direction, modulating a laser beam to be output from the optical head in accordance with the received image data, and irradiating the modulated laser beam onto the optical disc to draw the visible image corresponding to the image data, sequentially;

acquiring the total amount of the transmitted data and calculating a position corresponding to the acquired total data amount in the disc diameter direction at which a drawing operation is currently performed while the computer transmits the image data to the optical disc image drawing apparatus, sequentially; and displaying a picture of the entire drawing image on the display so that the calculated position at which the drawing operation is currently performed can be visually recognized, sequentially.

(2) The method according to (1), wherein the computer intermittently transmits the image data in a pertinent data amount to the optical disc image drawing apparatus, the optical disc image drawing apparatus stores the image data intermittently transmitted in a buffer memory and reads the stored image data so as to perform the drawing operation, and the computer monitors a remaining amount of the buffer memory or a data amount of drawing standby image data stored in the buffer memory and transmits following image data of the pertinent data amount to the optical disc image drawing apparatus according to the detection that that the remaining amount of the buffer memory increases to a predetermined value (for example, a pertinent data amount to be next transmitted) or more or the data amount of the drawing standby image data decreases to a predetermined value (for example, a pertinent data amount to be next transmitted) or less.

(3) The method according to (1), wherein the buffer memory comprises a ring buffer and the image data stored in the buffer memory of which the drawing operation is ended is updated into the image data transmitted from the computer, sequentially.

(4) The method according to (1), wherein the computer intermittently transmits the image data in a pertinent data amount to the optical disc image drawing apparatus so that a transmission speed at which the image data is transmitted to the optical disc image drawing apparatus from the computer is faster than a speed at which the optical disc image drawing apparatus draws the image corresponding to the transmitted image data, the optical disc image drawing apparatus temporally stores the intermittently transmitted image data in a buffer memory and successively reads the stored image data so as to perform the drawing operation, and the computer monitors a remaining amount of the buffer memory or a data amount of drawing standby image data stored in the buffer memory and transmits following image data of the pertinent data amount to the optical disc image drawing apparatus according to the detection that the remaining amount of the buffer memory increases to a predetermined value (for example, a pertinent data amount to be next transmitted) or more or the data amount of the drawing standby image data decreases to a predetermined value (for example, a pertinent data amount to be next transmitted) or less.

(5) The method according to (4), wherein the amount of the image data transmitted to the optical disc image drawing apparatus from the computer by one-time transmission or successive predetermined plural times of transmissions is constant.

(6) The method according to (4), wherein the buffer memory comprises a ring buffer and the image data stored in the buffer memory of which the drawing operation is ended is updated into the image data transmitted from the computer, sequentially.

(7) The method according to (1), wherein a method of displaying the picture of the entire drawing image onto the display so that the calculated position at which the drawing operation is currently performed can be visually recognized includes one of a method of varying display aspects (brightness, contrast, and coloring) in an inner periphery area and an outer periphery area along the currently drawing position in the disc diameter direction, a method of displaying a mark (command ring) indicating the currently drawing position in the disc diameter direction, or a method of jointly using the both methods.

(8) The method according to (1), wherein to perform the displaying operation, a currently drawing position R2' in the disc diameter direction at the time of performing the drawing operation from an inner periphery side to an outer periphery side of the disc is calculated by calculating the following equation:

$$R2'=R1+((\text{Dall} \cdot N)/(M \cdot L)), \text{ and}$$

the currently drawing position R2' in the disc diameter direction at the time of performing the drawing operation from the outer periphery side to the inner periphery side of the disc is calculated by calculating the following equation:

$$R2'=R1-((\text{Dall} \cdot N)/(M \cdot L))$$

where Dall represents the total amount of the image data transmitted to the optical disc image drawing apparatus from the computer, R1 represents a disc radial position at which the drawing operation is started, M represents the data amount of the drawing image per one rotation of the disc, N represents a unit moving distance in the disc radial direction of the optical head, and L represents the number of overwritings at the same radial position of the optical head.

(9) A computer readable recording medium storing an optical disc image drawing program executed by a computer communicatable with an optical disk image drawing apparatus that loads an optical disc in which a visible image can be drawn onto a surface thereof, rotates the optical disc, moves an optical head in a disc diameter direction, modulates a laser beam to be output from the optical head in accordance with image data received from the computer, and irradiates the modulated laser beam onto the optical disc to draw the visible image corresponding to the image data, sequentially, the optical disc image drawing program causing the computer to executes the steps of:

transmitting the image data of the visible image to be drawn on the optical disc to the optical disk image drawing apparatus, sequentially;

acquiring the total amount of the transmitted data and calculating a position corresponding to the acquired total data amount in the disc diameter direction at which a drawing operation is currently performed while the computer transmits the image data to the optical disc image drawing apparatus, sequentially; and displaying a picture of the entire drawing image on a display so that the calculated position at which the drawing operation is currently performed can be visually recognized, sequentially.

(10) An optical disc image drawing system, comprising:

an optical disc image drawing apparatus that loads an optical disc on which a drawing operation can be performed on a surface thereof, rotates the optical disc, moves an optical head in a disc diameter direction, modulates a laser beam to be output from the optical head in accordance with image data received from the computer, and irradiates the modulated laser beam onto the optical disc to draw the visible image corresponding to the image data;

a computer that transmits the image data of the visible image to be drawn on the optical disc to the optical disk image drawing apparatus, acquires the total amount of the transmitted data and calculates a position corresponding to the acquired total data amount in the disc diameter direction at which a drawing operation is currently performed while the computer transmits the image data to the optical disc image drawing apparatus, sequentially; and a display displays a picture of the entire drawing image thereon so that the calculated position at which the drawing operation is currently performed can be visually recognized, sequentially.

According to the aspect of the invention, the image data is transmitted from the computer to the optical disc image drawing apparatus, and the total amount of the transmitted image data are acquired, sequentially, the currently drawing position in the disc diameter direction, which corresponds to the acquired total data amount is calculated, and a picture of the entire drawing image is displayed on the display so that the currently drawing position in the disc diameter direction can be visually recognized. Accordingly, a user can easily know to which part of the drawing image is drawn at the time of drawing.

According to the aspect of the invention, the optical disc image drawing apparatus may serve as an optical disc recording apparatus.

According to the aspect of the invention, the intermittently transmitted 'pertinent data amount' may include a data amount per one rotation, a data amount evenly dividing the data amount per one rotation, a data amount unevenly dividing the data amount per one rotation, and a data amount integer-multiplexing the data amount per one rotation.

In order to correctly display a current drawing progress, it is necessary to decrease a difference between the position in the disc diameter direction in which the drawing is actually performed on the optical disc and the currently drawing position in the disc diameter direction, which is recognized on a mark of the display. It is possible to reduce an update width (a width in which the currently drawing position recognized on the mark is shifted in the disc diameter direction at once) in the disc diameter direction of the currently drawing position by reducing a display update cycle. For example, when a ratio of the update width in the disc diameter direction of the currently drawing position to an width in the diameter direction of the drawing area of the optical disc is set to 10% or less (corresponding to 3.3 mm or less when the width in the disc diameter direction of the drawing area on the surface of the optical disc is 33 mm), it is possible to display the drawing progress almost correctly. Similarly, when the ratio of the update width in the disc diameter direction of the currently drawing position to the width in the diameter direction of the drawing area of the optical disc is set to 5% or less (similarly, corresponding to 1.65 mm or less), it is possible to display the drawing progress more correctly. Similarly, when the ratio of the update width in the disc diameter direction of the currently drawing position to the width in the diameter direction of the drawing area of the optical disc is set to 3% or less (similarly, corresponding to 0.99 mm or less), it is possible to display the drawing progress even more correctly.

BRIEF DESCRIPTION OF THE DRAWINGS

FIG. 16 is a diagram illustrating an actual display example in accordance with the display method of FIG. 15.

DETAILED DESCRIPTION OF PREFERRED EMBODIMENTS

Figure 1:
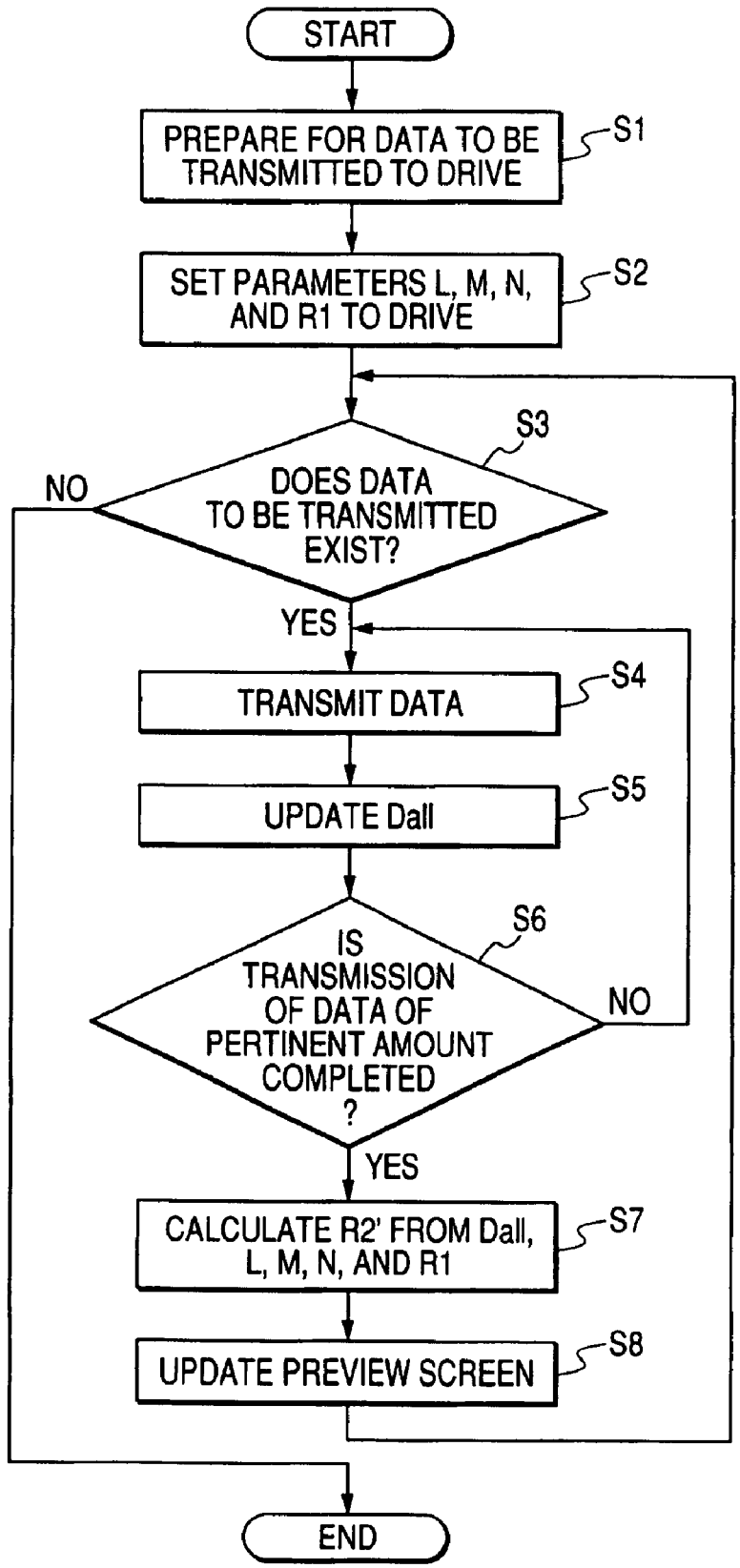
FIG. 1 is a flowchart illustrating a controlling operation at the time of drawing executed by a drawing program of a host computer shown in FIGS. 3 and 4.
Figure 2:
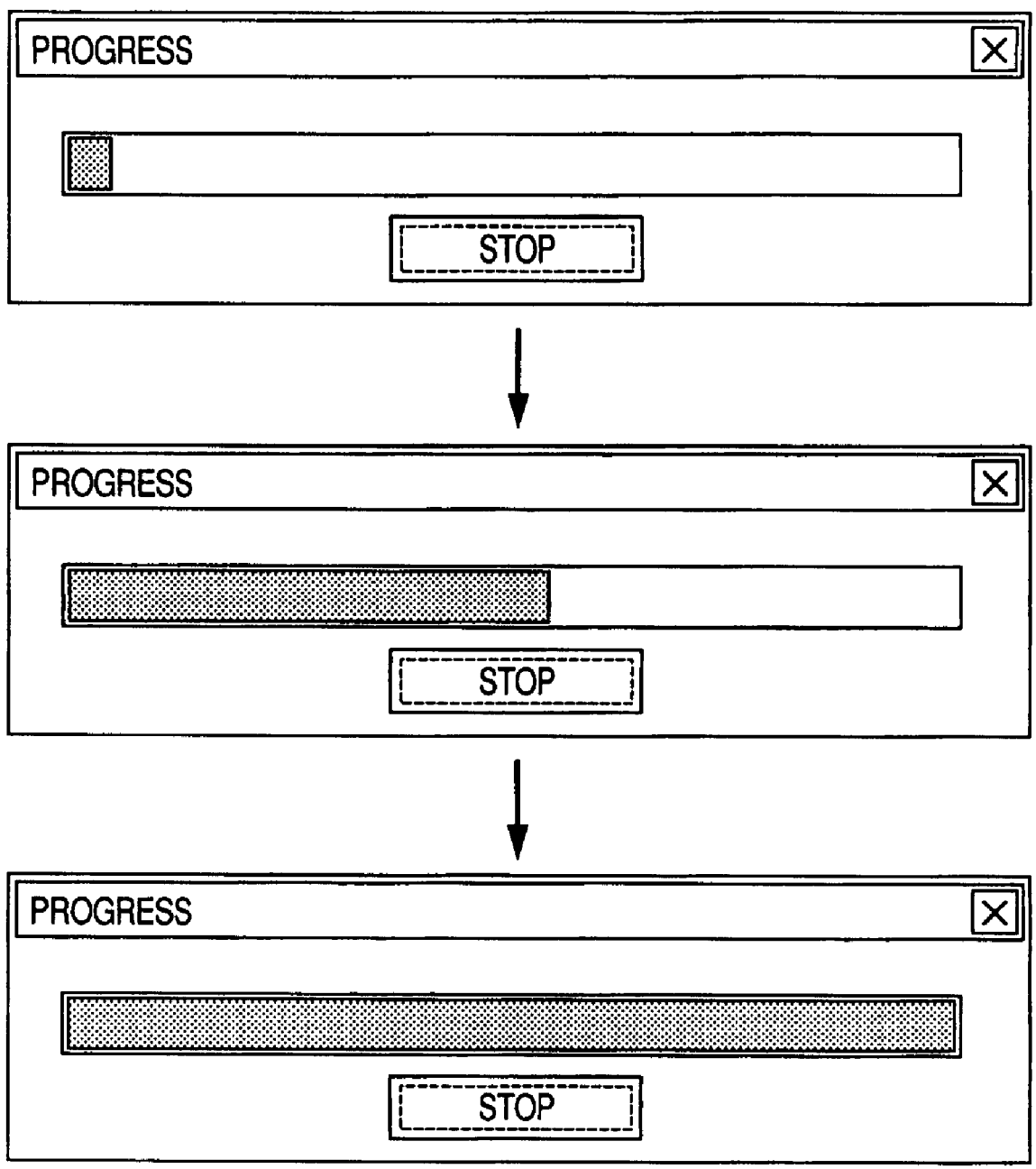
FIG. 2 is a diagram illustrating a display example of a drawing progress with progress bars in a known optical disc image drawing apparatus.

Hereinafter, an embodiment of the invention will be described below. In the embodiment, a case where the invention is applied to a CD recording and reproducing system will be described. In the embodiment, an optical disc is rotated at a constant angular velocity and a pertinent amount of image data of an image to be drawn on a surface of the optical disc is intermittently transmitted to an optical disc image drawing apparatus from a computer. The optical disc image drawing apparatus stores the transmitted image data in a buffer memory at first and successively reads the stored image data at a constant speed to perform the drawing on the surface of the optical disc. The number of drawing pixels per one rotation of the optical disc is constant irrespective of a position in a disc diameter direction. During performing the drawing, a computer counts the total amount of image data having been transmitted, calculates a radial drawing position corresponding to the counted total amount as a radial position currently drawing before performing the next transmission every time an intermittent transmission is finished once, and sequentially displays a picture of a drawing image on the display so as to visually identify the currently drawing radial position calculated above.

Figure 3:
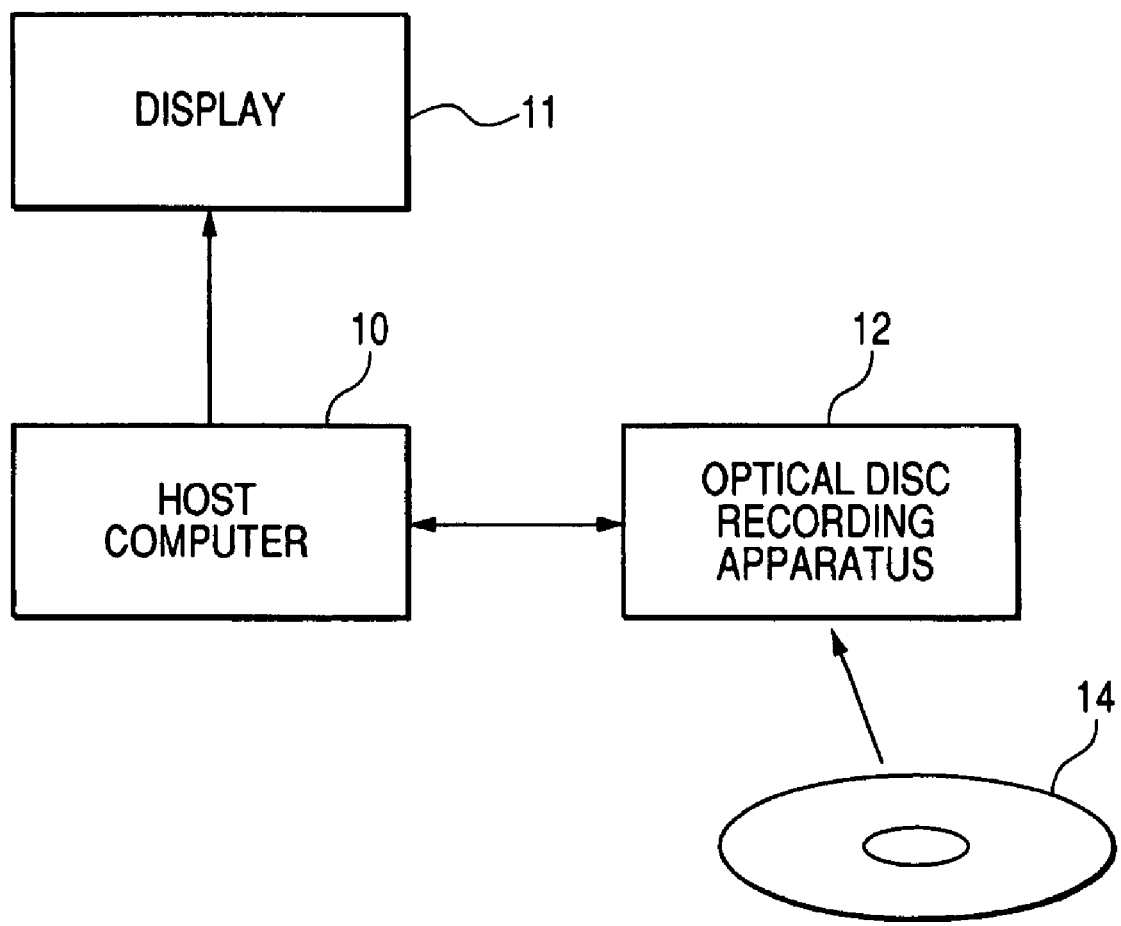
FIG. 3 is a diagram illustrating an embodiment of the invention and is a block diagram illustrating a configuration of a CD recording and reproducing system to which the invention is applied.

FIG. 3 illustrates a system configuration of the CD recording and reproducing system to which the invention is applied. The system includes a host computer 10 (a host apparatus) and a CD-R drive 12 (an optical disc recording apparatus) serving as the optical disc image drawing apparatus connected to be communicatable with each other. A display 11 is connected to the host computer 10. The CD-R drive 12 may be built in the host computer 10 and may be externally provided. The host computer 10, the CD-R drive 12, and the display 11 may be integrally configured. A CD-R disc 14 in which an image can be drawn on a label surface is loaded on the CD-R drive 12. A data recording and reproducing program (application software) recording data on a data recording layer of the CD-R disc 14 and reproducing the recorded data and a drawing program (application software) for forming (drawing) an image on a drawing layer of the CD-R disc 14 are installed in the host computer 10. Original image data of an image to be drawn is stored in a storage device of the host computer 10 in advance at the time of drawing operation. The original image data, for example, is configured in a monochrome multiple contrast bit map format and includes the collection of data (contrast data) representing the contrasts of pixels constituting one sheet of image to be drawn on one CD-R disc 14.

Figure 4:
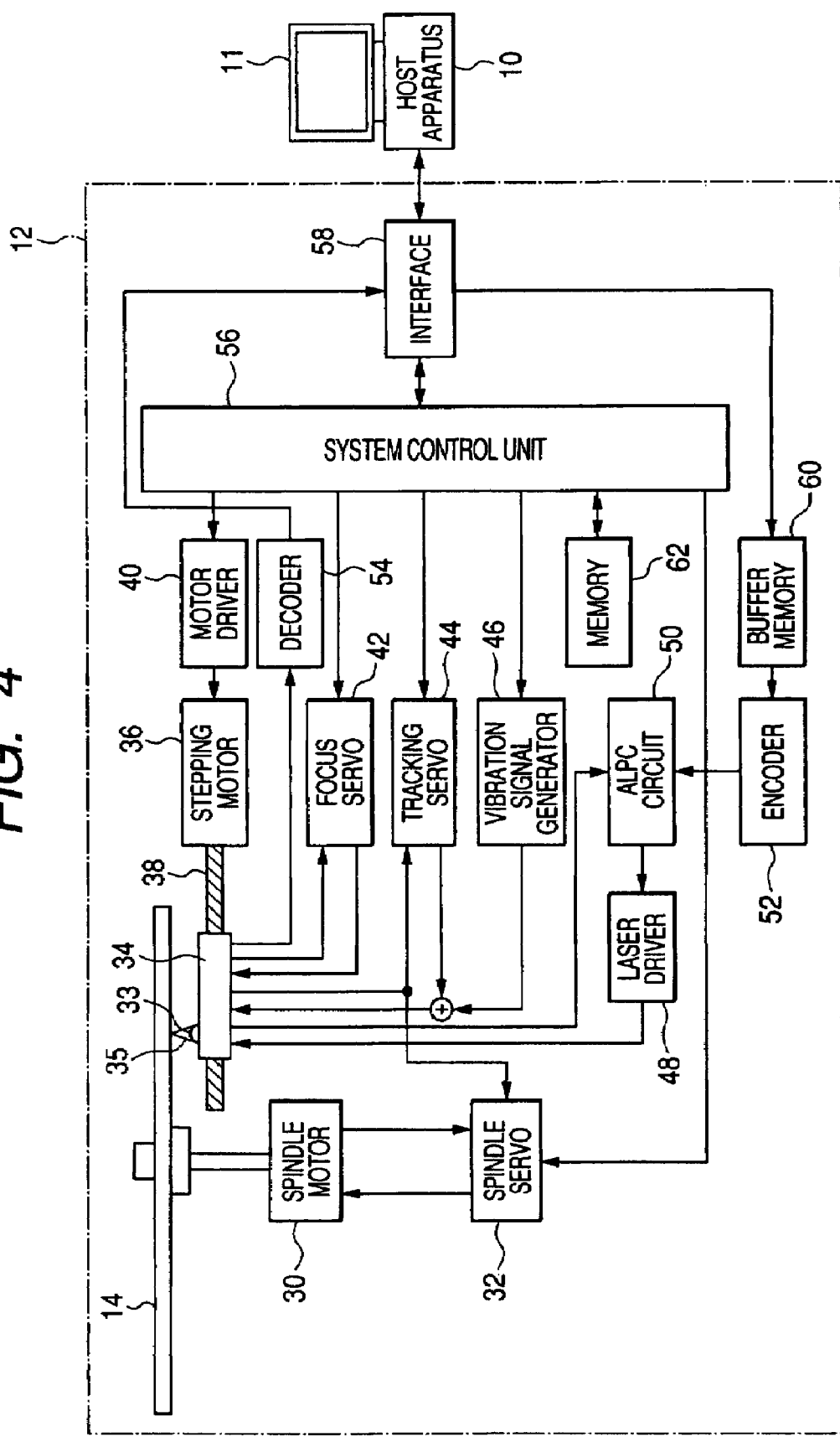
FIG. 4 is a block diagram illustrating a system configuration of a CD-R drive 12 in the CD recording and reproducing system of FIG. 3.
Figure 5:
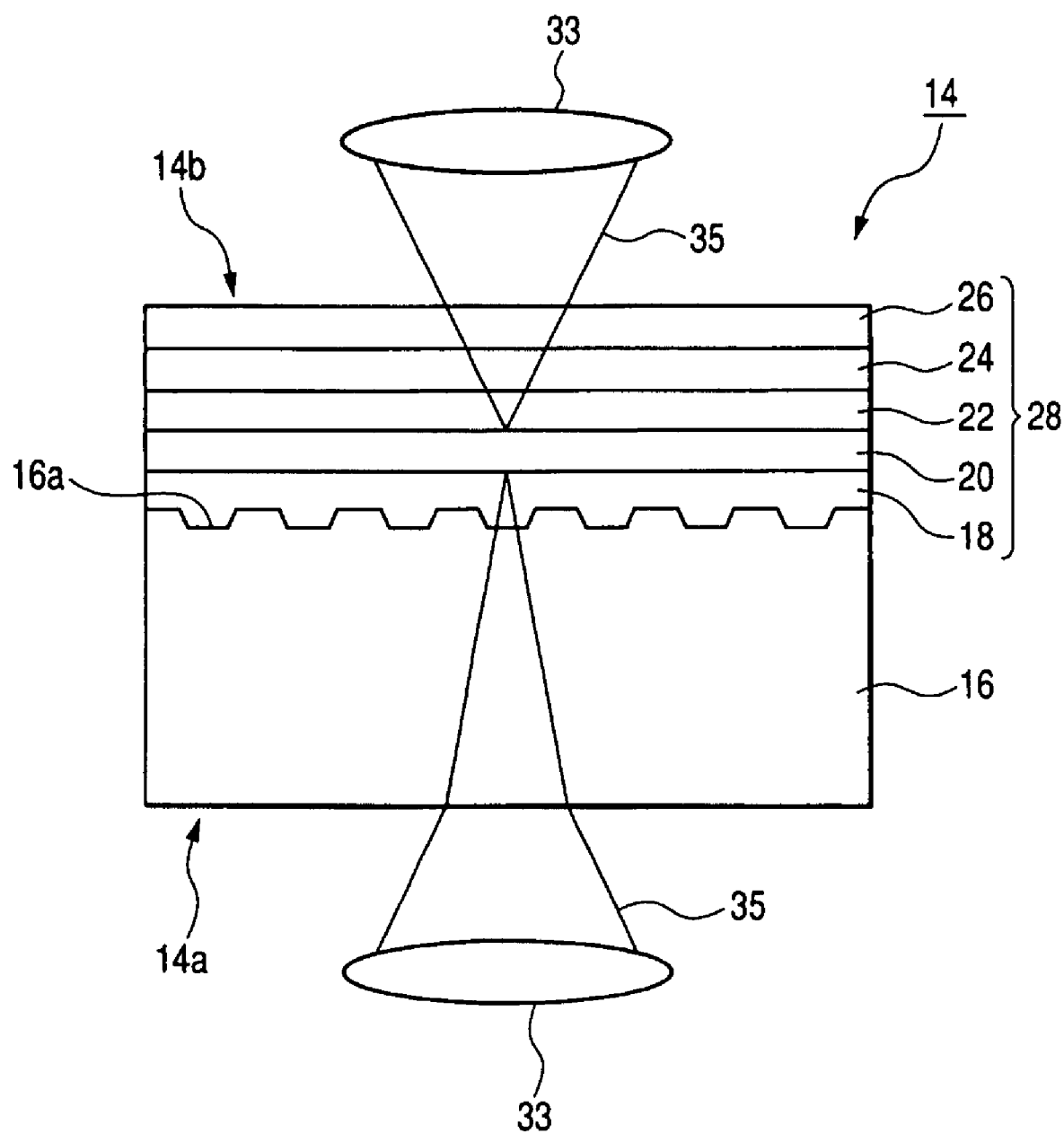
FIG. 5 is a diagram schematically illustrating a sectional structure taken along a surface passing a central axis of a CD-R disc 14 corresponding to the drawing on the label surface of FIG. 4.

The CD-R drive 12 will be described below. FIG. 4 illustrates the configuration of a system in the CD-R drive 12 in the CD recording and reproducing system of FIG. 3. The CD-R disc 14 in which the image can be drawn on the label surface is loaded on the CD-R drive 12. FIG. 5 is a diagram schematically illustrating a sectional structure of the CD-R disc 14 in which the image can be drawn on the label surface taken along a surface passing a central axis thereof. The CD-R disc 14 has a transparent substrate 16 and includes a pigment layer serving as a data recording layer 18, a reflective layer 20, a protective layer 22, a thermosensitive layer serving as a drawing layer 24, and a protective layer 26 sequentially laminated on a surface on which a pre-groove 16a is formed on the transparent substrate 16. A laser beam 35 is irradiated from a surface 14a (a data recording surface) in which the transparent substrate 16 is exposed at the time of recording and reproducing the data. At this time, the laser beam 35 is reflected on the reflective layer 20 to be focused. The laser beam 35 is irradiated from a surface (a label surface) 14b in which a laminated film 28 is formed at the time of drawing. At this time, the laser beam 35 is reflected on the reflective layer 20 to be focused.

In FIG. 4, the CD-R disc 14 is rotated by a spindle motor 30. A spindle servo 32 controls the rotation of the spindle motor 30 to maintain a constant linear velocity (CLV) at the time of recording and reproducing the data and controls the rotation of the spindle motor 30 in a constant angular velocity (CAV) at the time of drawing. An optical pick-up 34 (an optical head) is moved in the diameter direction of the CD-R disc 14 by a moving mechanism 38 employing a feed screw, which is driven by a stepping motor 36 (a threading operation). The stepping motor 36 is driven by a motor driver 40 in accordance with a command of a system control unit 56.

A focus servo 42 performs a focusing control of the optical pick-up 34 at the time of recording and reproducing the data, and at the time of performing the drawing. A tracking servo 44 performs a tracking control of the optical pick-up 34 at the time of recording and reproducing the data. The tracking control is turned off at the time of drawing. A vibration signal generator 46 generates a vibration signal at the time of drawing and vibrates an objective lens 33 by supplying the generated vibration signal to a tracking actuator of the optical pick-up 34, thereby vibrating the laser beam 35 in the diameter direction of the CD-R disc 14 with an amplitude larger than a unit moving amount N of the optical pick-up 34. By this vibration operation, the laser beam 35 is scans while meandering with the amplitude larger than the unit moving amount N of the optical pick-up 34. With the combination of the vibration operation and an overwriting operation at the same position in the diameter direction, the laser beam 35 can draw an image in which clearance is small. A laser driver 48 drives a laser diode 70 (FIG. 6) in the optical pick-up 34 at the time of recording and reproducing the data, and at the time of performing the drawing. An ALPC (Automatic Laser Power Control) circuit 50 controls the power of the laser beam to given values at the time of recording and reproducing the data, and at the time of performing the drawing operation.

An encoder 52 encodes the recording data to a predetermined CD format at the time of recording the data. The laser driver 48 modulates the laser beam 35 in accordance with the encoded recording data and records the recording data on the data recording layer 18 of the CD-R disc 14 with a pit. The encoder 52 generates a pulse signal (a drawing signal) of which duty is changed in accordance with the contrast data of the pixels constituting the image data at the time of drawing. The laser driver 48 modulates the laser beam 35 in accordance with the pulse signal of which duty is changed and changes a visible light characteristic of the drawing layer 24 in the CD-R disc 14, thereby performing the drawing operation in monochrome multiple contrasts. A decoder 54 reproduces the data by EFM-demodulating a return light receiving signal of the optical pick-up 34 at the time of reproducing the data.

The host computer 10 transmits the recording data at the time of recording the data and the image data at the time of drawing to the CD-R drive 12. The recording data or the image data is received to an interface 58 of the CD-R drive 12 and is temporally stored in the buffer memory 60 and then is transmitted to the encoder 52. Data reproduced by the decoder 54 is transmitted to the host computer 10 through the interface 58 at the time of reproducing the data. The host computer 10 transmits an operator's command to the CD-R drive 12 at the time of recording and reproducing the data, and at the time of drawing. The command is transmitted to the system control unit 56 through the interface 58. The system control unit 56 sends the operator's command to circuits in the CD-R drive 12 and allows the circuits to perform the corresponding operations. Drawing condition parameter data to be described below is stored in a memory 62.

Figure 6:
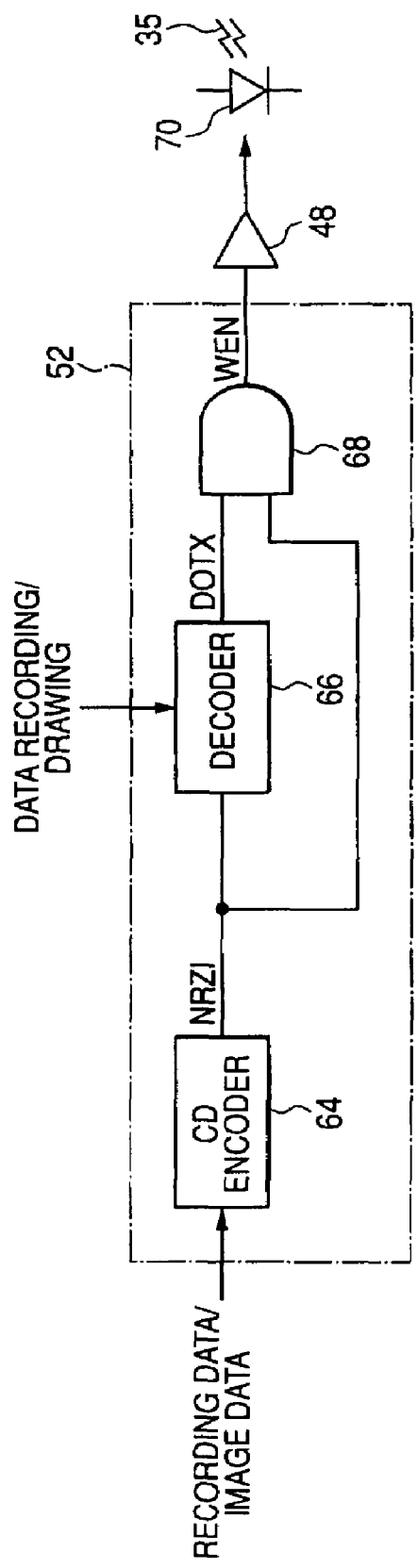
FIG. 6 is a block diagram illustrating a configuration example of an encoder 52.

The encoder 52 in the CD-R drive 12 will be described below. FIG. 6 illustrates a configuration example of the encoder 52. In FIG. 6, a CD encoder 64 inputs data (the recording data at the time of recording the data and the image data at the time of drawing) transmitted from the host computer 10 of FIG. 4 through the interface 58 and the buffer memory 60. The CD encoder 64 EFM-modulates the recording data after interleaving it at the time of recording the data, performs a general signal processing (adding a synchronization signal, parity data, and a margin bit and NRZI (Non Return to Zero Invert) conversion), and successively prepares a recording signal in which 1 EFM frame is constituted by 588 channel bits. The recording signal prepared by the CD encoder 64 at the time of recording the data just passes an end gate 68 and is transmitted to the laser driver 48. The laser driver 48 performs binary modulation of the power of the laser beam 35 by driving the laser diode 70 in accordance with the recording signal (increasing the laser power to a level in which a pit is formed in a zone in which the recording signal has a "H" level and decreasing the laser power to a level in which the pit is not formed in a zone in which the recording signal has a "L" level) and records the recording signal on the data recording layer 18 of the CD-R disc 14 with the pit.

The CD encoder 64 processes the image data at the time of drawing in the same manner as the recording data at the time of recording the data. However, the CD encoder 64 may not interleave the image data. When the CD encoder 64 does not interleave the image data, the CD encoder 64 just EFM-modulates the image data without interleaving the image data, performs the same processing (adding the synchronization signal, the parity data, and the margin bit and the NRZI conversion) and successively prepares the data in which 1 EFM frame is constituted by 588 channel bits. Here, the data of 1 EFM frame includes a one-pixel image data (contrast data representing the contrast of the pixel). In other words, in the embodiment, 1 EFM frame represents the one-pixel data. The image data is interleaved by the CD encoder 64. Then, in the case that the sequence of the image data is changed by the interleaving processing, a desired image may not be drawn. Therefore, in this case, the host computer 10 performs inverse interleaving processing (a processing for changing in advance the sequence of the image data that, when the image data is interleaved by the CD encoder 64, the sequence of the image data is returned to the sequence of the image data before the inverse interleaving processing is performed by the host computer 10) and then, transmits the inversely interleaved image data to the CD-R drive 12. Accordingly, when the transmitted image data is interleaved by the CD encoder 64, the sequence of the image data is returned to the sequence of a normal image data. The CD encoder 64 EFM-modulates the image data of which the sequence returns to the normal sequence.

The decoder 66 is switched at the time of recording the data and at the time of drawing. In other words, the decoder 66 successively outputs an "H"-level signal at the time of recording the data. The "H"-level signal is input into one input end of the end gate 68. Accordingly, the output of the CD encoder 64 which is input into the other input end of the end gate 68 at the time of recording the data, that is, the recording signal just passes the end gate 68.

The decoder 66 EFM-demodulates the data output from the CD encoder 64 and acquires the contrast data of the pixel one by one for 1 EFM frame at the time of drawing. The decoder 66 outputs a pulse signal DOTX of which the cycle has a 1 EFM frame length and of which the duty is changed in accordance with the contrast data for each acquired pixel. The pulse signal DOTX is input into one input end of the end gate 68. Accordingly, the end gate 68 opens a gate for a time corresponding to the contrast value of the pixel every 1 EFM frame cycle and just passes the output signal (an NRZI-converted EFM signal) of the CD encoder 64 input into the other input end for the corresponding time at the time of drawing. A segment signal WEN (a drawing signal drawing one pixel) of the NRZI signal output from the end gate 68 does not have any meaning. However, since the segment signal WEN is the NRZI signal, it has a duty of about 50%. Accordingly, the duty (a ratio of the total value of the pulse widths of the NRZI segment signal WEN passing the end gate 68 for the 1 EFM frame cycle corresponding to one pixel to 1 EFM frame length) of the NRZI segment signal WEN passing the end gate 68 for the 1 EFM frame cycle corresponding to one pixel to the 1 EFM frame length corresponds to the duty of the pulse signal DOTX, that is, corresponds to the contrast value of the corresponding pixel.

The NRZI segment signal WEN output from the end gate 68 at the time of drawing is transmitted to the laser driver 48 as the drawing signal. The laser driver 48 performs the binary modulation of the power of the laser beam 35 by driving the laser diode 70 in accordance with the drawing signal WEN (increasing the laser power to a level in which the image is drawn when the drawing signal WEN has a "H"-level zone and decreasing the laser power to a level in which the image is not drawn when the drawing signal WEN has an "L"-level zone) and performs the drawing by changing the visible light characteristic of the drawing layer 24 in the CD-R disc 14. In this case, since a circumferential distance (i.e., a circumferential length assigned for drawing one pixel) in a circumferential direction on the CD-R disc 14 corresponding to a frame length of 1 EFM) is very short, one drawn pixel is just recognized as one dot in human's eyes. Accordingly, a difference in duty to the 1 EFM frame length of the drawing signal WEN passing the end gate 68 is recognized as a different in density of the drawing the end gate in human's eyes (as the duty is higher, the image data is recognized as dense drawing). As described above, an image formed by contrast representation is drawn on the drawing layer 24 of the CD-R disc 14.

Figure 7:
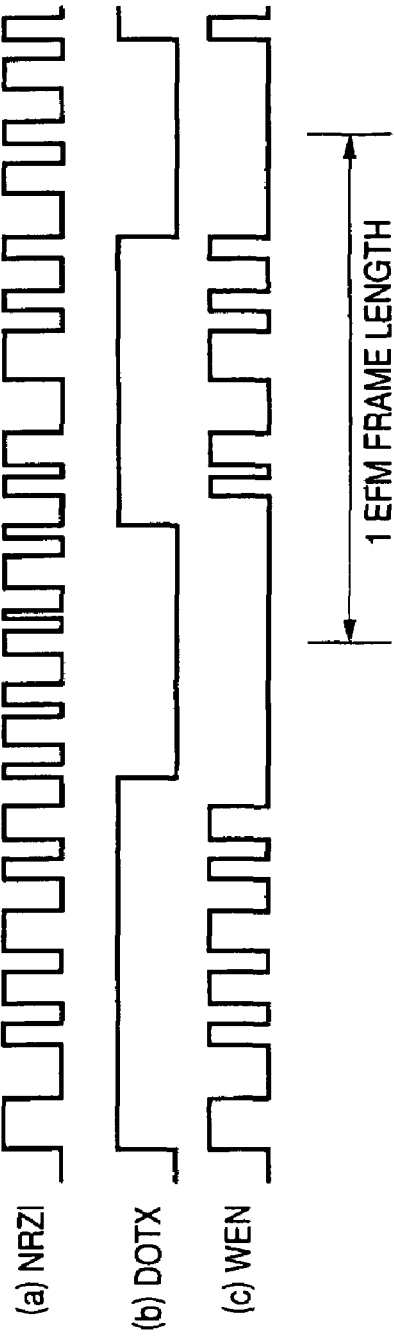
FIG. 7 is an operation waveform diagram of the encoder 52 of FIG. 6 at the time of drawing.

FIG. 7 illustrates an operation waveform of the encoder 52 of FIG. 6 at the time of drawing. In FIG. 7, an NRZI signal of (a) is switched in the end gate 68 by a pulse signal DOTX of (b) at a cycle of 1 EFM frame to prepare an NRZI segment signal WEN of (c).

Hereinafter, there will be described the outline of operations of the CD recording and reproducing system of FIG. 4 at the time of recording and reproducing the data and at the time of drawing described above.

Operation in Recording Data

The data recording surface 14a of the CD-R disc 14 (FIG. 5) faces the optical pick-up 34 downward at the time of recording the data. The spindle servo 32 controls the spindle motor 30 in a constant linear velocity (CLV) so that a wobble signal extracted from a light receiving signal of the optical pick-up 34 has a predetermined frequency. The focus servo 42 and the tracking servo 44 are changed to an 'on' state. The vibration signal generator 46 stops generating the vibration signal. The system control unit 56 performs a controlling operation so that an optical axial position of the objective lens 33 is constantly provided around a recording position of the CD-R disc 14 by detecting the rotation of the disc, driving the stepping motor 36 for a predetermined time every predetermined rotation, and moving the optical pick-up 34 in a direction toward an outer peripheral of the disc, sequentially.

The recording data is transmitted to the CD-R drive 12 from the host computer 10. The recording data is stored in the buffer memory 60 through the interface 58 at first. The recording data is EFM-modulated after the recording data is read from the buffer memory 60 in response to the progress of the recording operation and is interleaved by the encoder 52 and is converted to the NRZI signal. The NRZI signal is transmitted to the laser driver 48 through the ALPC circuit 50. The laser driver 48 modulates the recording laser beam 35 to the NRZI signal. The modulated recording laser beam 35 is output from the optical pick-up 34 and is irradiated to the data recording layer 18 of the CD-R disc 14, thereby recording the data.

Operation in Reproducing Data

The data recording surface 14a of the CD-R disc 14 (FIG. 5) faces the optical pick-up 34 downward at the time of reproducing the data in the same manner as at the time of recording the data. The spindle servo 32 controls the spindle motor 30 in a constant linear velocity (CLV) so that a clock reproduced from the light receiving signal of the optical pick-up 34 has a predetermined frequency. The focus servo 42 and the track servo 44 are changed to an 'on' state. The vibration signal generator 46 stops generating the vibration signal. The system control unit 56 performs the controlling operation so that the optical axial position of the objective lens 33 is constantly provided around the recording position of the CD-R disc 14 by detecting the rotation of the disc, driving the stepping motor 36 for the predetermined time every predetermined rotation, and moving the optical pick-up 34 in the direction toward outer peripheral of the disc, sequentially. The optical pick-up 34 outputs a reproduction laser beam 35 and reads a signal recorded on the data recording layer 18 of the CD-R disc 14. The signal read by the optical pick-up 34 is EFM-demodulated by the decoder 54, is output from the CD-R drive 12 through the interface 58, and is transmitted to the host computer 10.

Operation in Drawing

The drawing surface 14b of the CD-R disc 14 (FIG. 5) faces the optical pick-up 34 downward at the time of drawing. The spindle servo 32 controls the spindle motor 30 in a constant angular velocity (CAV) by a PLL control so that an FG pulse (for example, 6 or 18 pulses per one rotation are output at even angular intervals) every predetermined rotation angle and a clock dividing a crystal oscillation clock are phase-synchronized. The focus servo 42 is turned on and the tracking servo 44 is turned off. The vibration signal generator 46 generates an oscillation signal. The system control unit 56 detects the rotation of the disc, drives the stepping motor 36 by a predetermined amount at a constant rotation angle position every the number of rotations given as the number of overwritings, and moves the optical pick-up 34 in the direction toward the outer peripheral of the disc, sequentially.

The image data is transmitted to the CD-R drive 12 from the host computer 10. The image data is stored in the buffer memory 60 through the interface 58. The image data is read from the buffer memory 60 sequentially (successively) in response to the progress of the drawing operation and is EFM-modulated by the encoder 52 (alternatively, EFM-modulated after being interleaved). Next, the image data is converted to the NRZI signal (a) and is modulated to the NRZI segment signal WEN (c) having the duty in accordance with the contrast values of the pixels constituting the image data. The NRZI segment signal WEN is transmitted to the laser driver 48 through the ALPC circuit 50. The laser driver 48 modulates the drawing laser beam 35 to the NRZI segment signal WEN. The modulated drawing laser beam 35 is output from the optical pick-up 34 and is irradiated to the drawing layer 24 of the CD-R disc 14 to form a visible image, that is, perform the drawing.

Figure 8:
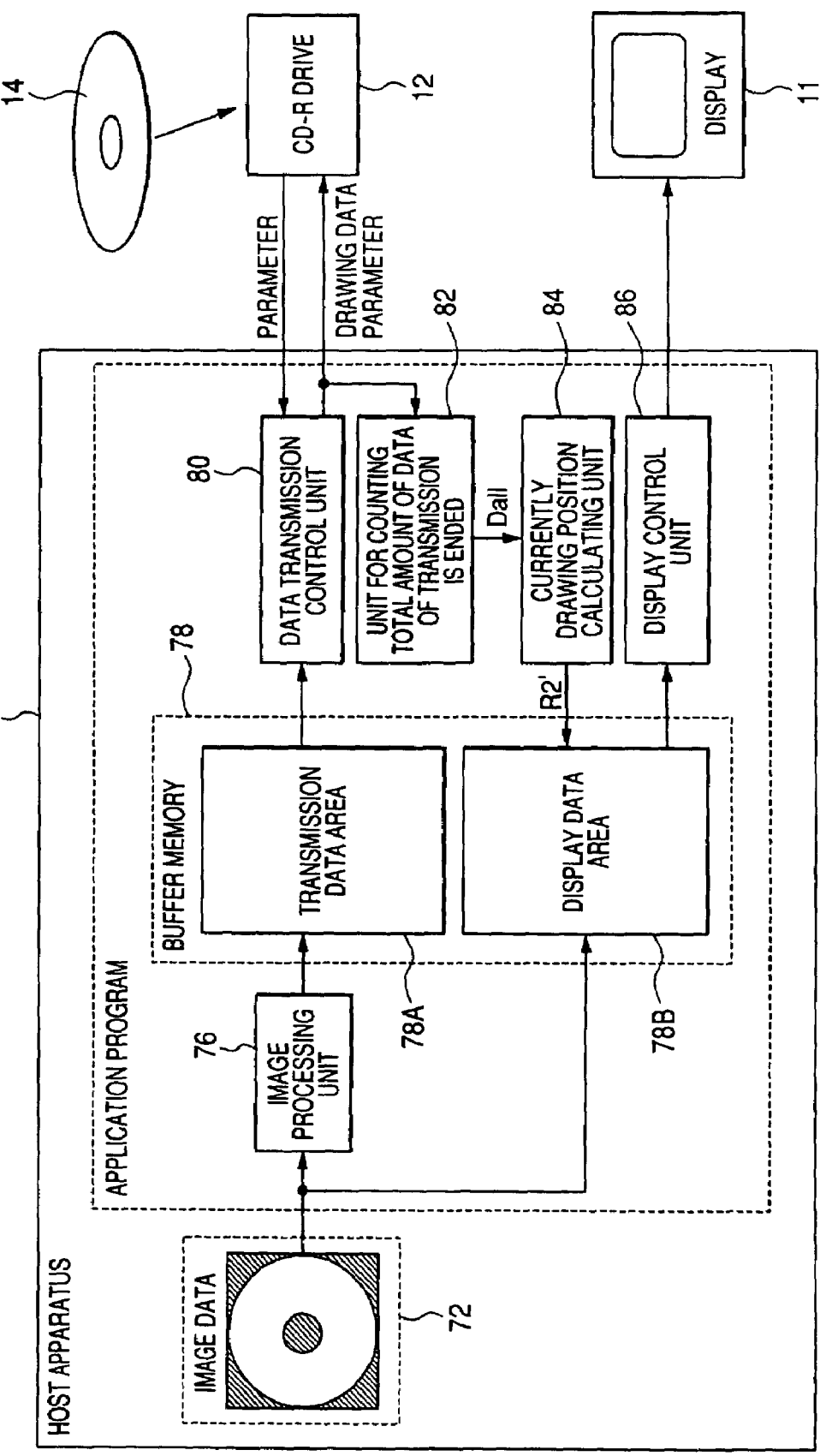
FIG. 8 is a functional block diagram of a drawing controlling operation by a host computer 10 of FIGS. 3 and 4.

Next, a control at the time of drawing executed by a drawing program loaded on the host computer 10 and the CD-R drive 12 will be specifically described. FIG. 8 illustrates function blocks of a drawing controlling operation performed by the host computer 10 are shown in FIG. 8. Original image data of an image to be drawn is stored in an external storage device 72 such as a hard disk drive. The image data of one image selected by an operator as an image drawn in one CD-R disc 14 is read from the external storage device 72. An image processing unit 76 prepares (extracts) the drawing image data adapted to a drawing condition parameter (described later) from the original image data read from the external storage device 72. The prepared drawing image data is stored in a transmission data area 78A of the buffer memory 78 at first. A series of processes such the reading of the original data from the external storage device 72, the preparing of the drawing image data, and the storing of the prepared drawing image data in the transmission data area 78A of the buffer memory can be completed before starting the drawing operation of the entire image to be drawn (that is, the entire drawing image data of the image can be stored in the transmission data area 78A of the buffer memory 78 before starting the drawing operation). Alternatively, the original image data to be drawn is read from the external storage device 72 sequentially while performing the drawing and the drawing image data adapted to the drawing condition parameter is prepared in the image processing unit 76, thereby storing the prepared drawing image data in the transmission data area 78A of the buffer memory 78 (that is, performing the series of processes while performing the drawing). The entire original image data of the image to be drawn is read from the external storage device 72 and is stored in the buffer memory 78B of the buffer memory 78 before starting the drawing operation. The original image data is used to display a drawing preview image.

A data transmission control unit 80 transmits and receives the data (the drawing condition parameter data and the drawing image data) to and from the CD-R drive 12. In other words, the following data are read from the memory 62 of the CD-R drive 12 and is transmitted to the data transmission control unit 80 as the drawing condition parameter before starting the drawing operation:

N: Unit moving amount in the disc diameter direction of the optical pick-up 34 by the stepping motor 36

A combination of a plurality of kinds including the rotation velocity (the number of spindle rotations) of the spindle motor 30 and an encoding velocity of the image data by the encoder 52, the combination being 'a drawing mode' which the operator can select The unit moving amount N, for example, is about 10 μm. In other words, when the unit moving amount N is about 10 μm, it is possible to draw an image in which a clearance is small. An example of the drawing mode is shown in Table 1.

TABLE 1

| Drawing mode | Encoding velocity magnification | Number of spindle rotations | Number of pixels per one rotation of disc | Drawing velocity |
| --- | --- | --- | --- | --- |
| 1 | 47.25 times | 131.25 rps | 2,246 pixels | High |
| 2 | 45.0 times | 75.0 rps | 4,410 pixels | Medium |
| 3 | 22.5 times | 37.5 rps | 4,410 pixels | Low |

The data of the drawing mode transmitted to the data transmission control unit 80 from the CD-R drive 12 includes identification information of each drawing mode, the number of spindle rotations, and the encoding velocity (the encoding velocity magnification). As shown in Table 1, the drawing velocity and a drawing quality (resolution and contrast ratio) are changed depend on the drawing mode (that is, depending on the combination of the number of spindle rotations and the encoding velocity).

In the drawing modes 1 to 3 of Table 1, the number of spindle rotations and the encoding velocity (the encoding velocity magnification) are combined so that the number of pixels drawn per one rotation of the disc is a constant integer irrespective of a radial position. In other words, in an example of Table 1, one pixel corresponds to 1 EFM frame length (=588 channel bit). The 'encoding velocity' is an 'encoding frequency (=4.3218 Mbits (=a clock of 7,350 EFM frames for one second))×the encoding velocity magnification (a magnification to the standard encoding velocity) at a standard (1×) encoding velocity defined as a CD specification' and corresponds to the number of drawing pixels per unit time. Accordingly, a value of an encoding clock frequency (=4.3218 Mbits) at a standard velocity×the encoding velocity magnification÷the number of spindle rotations÷588' is the number (=EFM frames) of pixels per one rotation of the disc.

In FIG. 8, the following data are transmitted to the CD-R drive 12 from the data transmission control unit 80 as the drawing condition parameter data input on the drawing program by an operator's command before starting the drawing operation:

L: Number of overwritings at the same radial position

R1: Drawing starting radial position (a position at an inner periphery side in this embodiment)

R2: Drawing ending radial position (a position at an outer periphery side in this embodiment)

Drawing mode selected from plural kinds of drawing modes transmitted from the CD-R drive 12 by the operator The pertinent amount of the drawing image data stored in the transmission data area 78A of the buffer memory 78 is intermittently read in accordance with a predetermined rule and is transmitted to the CD-R drive 12 through the data transmission control unit 80 during performing the drawing operation.

A counter unit 82 for counting the total amount of data which has been transmitted counts the total data amount Dall of the data of which the transmission to the CD-R drive 12 from the host computer 10 is completed until now from starting the drawing operation during performing the drawing. A calculating unit 84 for calculating a current drawing position calculates a position R2' in a disc diameter direction of the currently drawing disc on the basis of the total amount of the data which has been transmitted and the pixel condition parameter data (Equation (3) to be described later). A display control unit 86 reads image data stored in a display data area 78B of the buffer memory 78 before starting the drawing operation and prepares a video signal of the entire image (that is, the entire drawing image) between the drawing starting radial position R1 and the drawing ending radial position R2 designated out of the entire image of the image data by the operator and displays the video signal on the display 11 as a preview image. The drawing preview image is displayed until the drawing is ended, and the drawing preview image is displayed while the position R2' in the disc diameter direction of the currently drawing disc calculated is sequentially changed so as to be visually recognizable during performing the drawing. A method of displaying the drawing preview image on the display 11 so as to visually recognize the position R2' in the disc diameter direction of the currently drawing disc includes a method (see FIG. 15 to be described later) of varying display aspects such as brightness, contrast, and coloring in an inner periphery area and an outer periphery area along the currently drawing position R2' in the disc diameter direction. The method may include a method (see FIG. 17 to be described later) of displaying the position R2' in the disc diameter direction of the currently drawing disc by the mark of a command ring (a ring displayed by a mark such as thin lines (a solid line and a dot line) drawn at the radial position by an aspect (for example, a color different from that of the drawing image) which can be visually differentiated from the drawing image. The method may include a method (see FIG. 18 to be described later) of jointly using the both methods (the method of varying the display aspects along the position R2' in the disc diameter direction and the method of displaying the position R2' in the disc diameter direction by the mark).

A controlling operation at the time of drawing, which is executed by the drawing program (application program) of the host computer 10 of FIG. 8 will be described with reference to FIG. 1. Here, the controlling operation is described in the case that a series of processes such the reading of the original data from the external storage device 72, the preparing of the drawing image data, and the storing of the prepared drawing image data in the transmission data area 78A of the buffer memory can be completed before starting the drawing operation of the entire image to be drawn (that is, the entire drawing image data of the image can be stored in the transmission data area 78A of the buffer memory 78 before starting the drawing operation). When the power of the CD-R drive 12 is turned on and the drawing program is started by the host computer 10, the data of the unit moving amount N in the disc diameter direction of the optical pick-up 34 and the plural kinds of drawing modes are transmitted to the host computer 10 from the CD-R drive 12 as the drawing condition parameter at first. The data of the drawing mode is displayed on a setting screen of the display 11. The operator performs operations for selecting the drawing image and the drawing mode, and operations for setting the number L of overwritings, the drawing starting disc radial position R1, and the drawing ending disc radial position R2. When the drawing image is selected, the original data of the corresponding image is read from the external storage device 72, the drawing image data suitable for the set drawing condition selected from the original image data is prepared in the image processing unit 76, thereby storing the prepared drawing image data in the transmission data area 78A of the buffer memory 78, and the entire drawing image data of the image transmitted to the CD-R drive 12 is stored in the transmission data area 78A (Step S1 of FIG. 1). A processing of the preparing of the drawing image data from the original image data will be described with reference to FIGS. 9 and 10.

Figure 9:
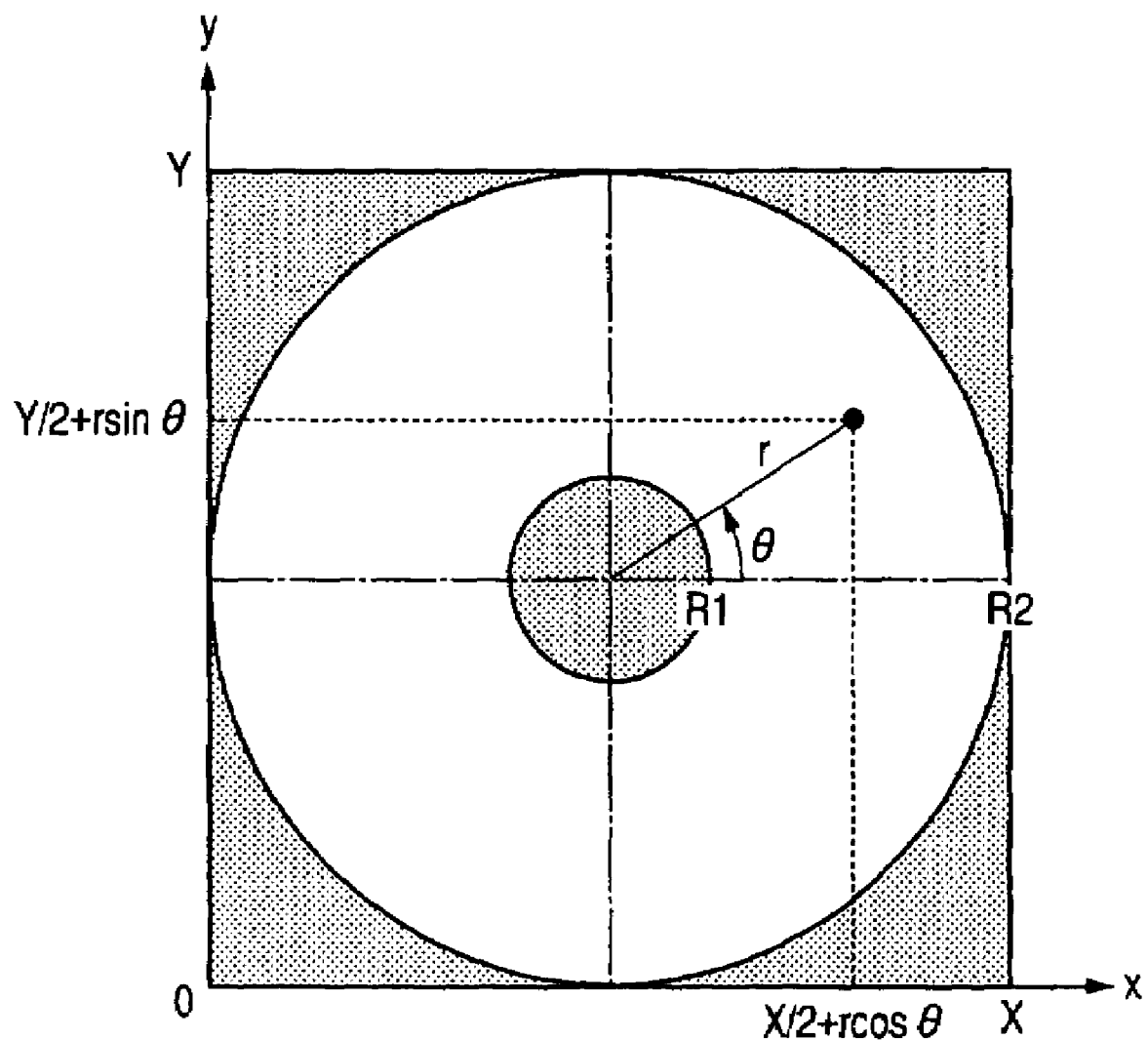
FIG. 9 is a diagram illustrating a coordinate positional relationship between original image data and drawing image data.

FIG. 9 illustrates a coordinate positional relationship between the original data and the drawing image data. An area displayed by a white ring in FIG. 9 represents an area where the drawing is performed on the label surface of the CD-R disc 14. The original image data, for example, is configured in a bit map format and coordinate positions of the pixels constituting the original image data are represented by a rectangular coordinate (x, y) in which the position of the lowermost part in the original image is set to the origin of a Y axis and the position of the leftmost part in the original image is set to the origin of an x axis. When the maximum value in the x axis direction is represented by X and the maximum value in the y axis direction is represented by Y in the coordinate of the original image, the coordinate of a central position (corresponding to a rotation center position of the CD-R disc 14) is represented by (X/2, Y/2).

Meanwhile, since the drawing is performed by moving the optical pick-up 34 in the disc diameter direction sequentially while rotating the CD-R disc 14, it is convenient that the drawing image data used for the drawing is represented by a polar coordinate in which the rotation center position of the CD-R disc 14 is set to a pole. Therefore, the coordinate positions of the pixels constituting the drawing image data are represented by a polar coordinate (r, θ) in which the center position (X/2, Y/2) of the original image on the rectangular coordinate is set to the pole, a direction parallel to the x axis direction of the rectangular coordinate is set to an original line, a radius vector is set to r, and a declination θ increases in counterclockwise direction from the original line. By this configuration, an arbitrary polar coordinate position (r, θ) of the drawing image data corresponds to a rectangular coordinate position (X/2+r cos θ, Y/2+r sin θ) of the original image data.

Figure 10:
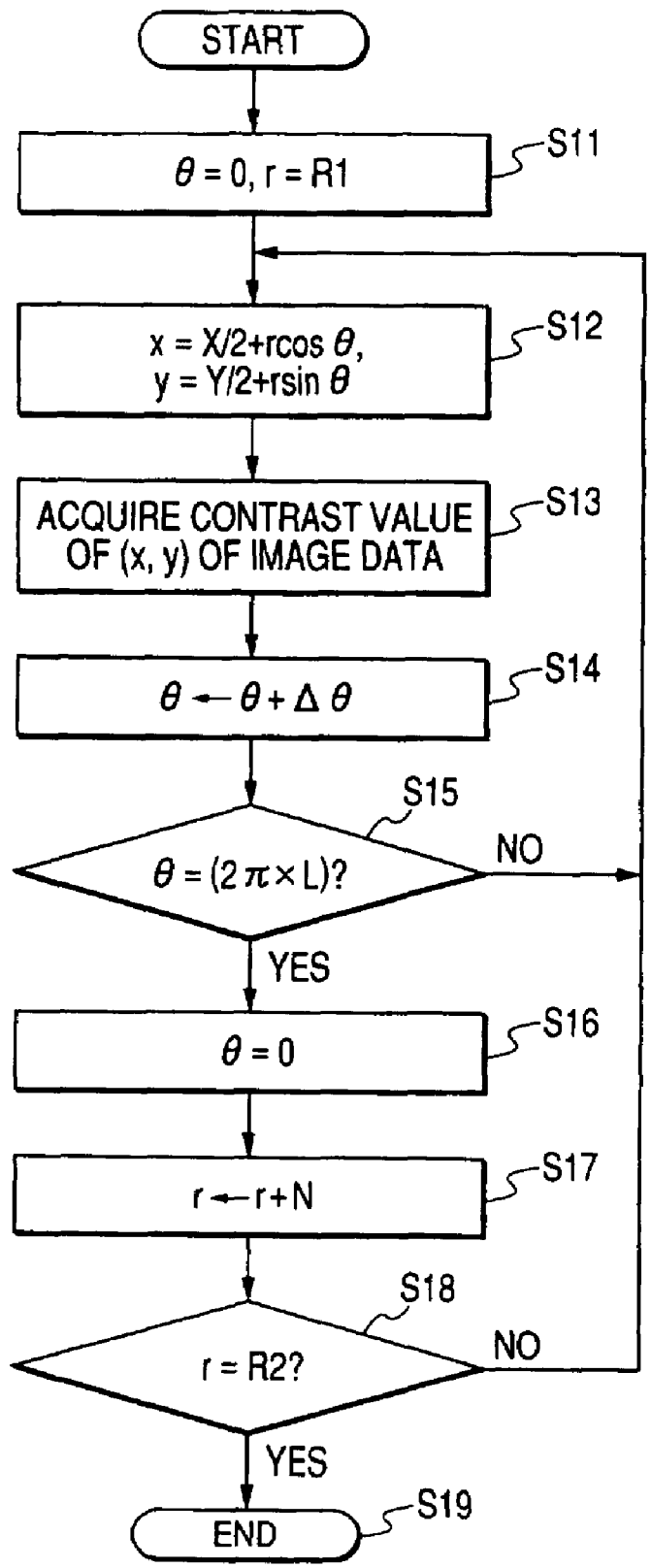
FIG. 10 is a flowchart illustrating a sequence of preparing the drawing image data on the basis of the original image data in an image processing unit 76 of FIG. 8.

FIG. 10 illustrates a sequence for preparing the drawing image data on the basis of the original image data. Here, a declination difference between the drawing pixels neighboring in the circumferential direction is represented by Δθ. A value of the declination difference Δθ is acquired by computing the number (see Table 1) of drawing pixels per one rotation of the disc on the basis of the combination of the number of spindle rotations and the encoding velocity in the drawing mode selected by the operator and by computing the following equation on the basis of the acquired number of drawing pixels per one rotation of the disc:

Δθ=2π/the number of drawing pixels per one rotation

FIG. 10 will be described. First, a position (x, y) on the rectangular coordinate corresponding to writing starting position (r=R1, θ=0) in a drawing area of the CD-R disc 14 (S11) is calculated in Equation (1) and Equation (2) (S12):

$$x = X/2 + r \cos\theta \quad (1)$$

$$Y = Y/2 + r \sin\theta \quad (2)$$

Next, the pixel data (contrast data) of the acquired position (x, y) is extracted from the original image in which the positions of the pixels are displayed in the rectangular coordinate (S13). When x and y calculated in Equation (1) and Equation (2) have a decimal part, image data of the corresponding position is extracted after converting the decimal part to an integer by rounding such as discarding or rounding off the decimal part.

Next, the positions (x, y) on the rectangular coordinate with respect to the positions (r=R1, θ=Δθ), (r=R1, θ=2Δθ), (r=R1, θ=3Δθ), and the like of the drawing pixels neighboring in the circumferential direction at the same position in the diameter direction are acquired from Equation (1) and Equation (2), sequentially, and the acquired image data of the positions (x, y) from the original image data are extracted sequentially (S14). When the operation is performed with the number of rotations designated with the number L of the overwritings (that is, at θ=2π×L), the acquiring of the drawing image data of the number of overwritings with respect to the writing starting radial position R1 is ended (S15).

Next, the value of θ is returned to 0 (S16) and the pixel data constituting the drawing image data is extracted from the original image data every Δθ from θ=0 to θ=2π×L one by one with respect to the next radial position r=R1+N in the same manner as the writing starting radial position R1. When this operation is repeated while increasing the value of the radial position by the unit moving amount N (S17), thereby reaching the writing ending radial position R2 (S18), the drawing image data is acquired from the original image data in the entire drawing area. Then, the preparing of the drawing image data is ended (S19). By this configuration, the drawing image data converted to the polar coordinate is prepared based on the original image data displayed in the polar coordinate.

The prepared drawing image data is stored in the transmission data area 78A of the buffer memory 78 (FIG. 8). When the drawing image data is prepared for the entire drawing image and is stored in the transmission data area 78A of the buffer memory 78, the preparation of the data to be transmitted to the CD-R drive 12 is completed (Step S1 of FIG. 1).

Meanwhile, the data such as the number L of overwritings, the drawing starting radial position R1, the drawing ending radial position R2, the identification information of the drawing mode selected by the operator at the same radial position are transmitted to the CD-R drive 12 from the host computer 10 as the drawing condition parameter used to perform the drawing with the CD-R drive 12 before starting the drawing operation (Step S2 of FIG. 1). The CD-drive 12 receives the data and sets itself to the drawing state under the drawing condition instructed by the data.

As described above, the preparation of the drawing is completed. Then, when the operator performs a drawing starting operation on the drawing program of the host computer 10, the drawing is started. The outline of the drawing operation will be described. When the drawing is started, the drawing image data (the pixel data (contrast data) constituting the drawing pixels) stored in the transmission data area 78A of the buffer memory 78 are intermittently transmitted by the host computer 10 to the CD-R drive 12 in the pertinent data amount (for example, a certain amount) in accordance to a predetermined rule in an acquisition (extraction) sequence (alternatively, in a sequence inverting this sequence by the above-mentioned inverse interleaving processing) by the processing of FIG. 10 from the original image data (Steps S3, S4, and S6 of FIG. 1). The CD-R drive 12 draws the pixels corresponding to the drawing image data received by the transmission onto the CD-R disc 14 in the sequence (alternatively, in a sequence inverting this sequence to the original preparing sequence by the above-mentioned interleaving processing) of the received image data from the writing starting radial position R1 one by one. In the drawing operation, since the CD-R drive 12 operates with the number of spindle rotations and the encoding velocity, the unit moving amount N in the disc diameter direction, and the number L of overwritings in the drawing mode set as the drawing condition and the pixel data transmitted from the host computer 10 are prepared (extracted) one by one so as to be adapted to the drawing conditions, the image corresponding to the original image is drawn onto the CD-R disc 14 from the writing starting radial position R1 by drawing the pixel corresponding to the pixel data in the preparing sequence of the pixel data. Accordingly, the pixel data (contrast data) is transmitted to the CD-R drive 12 from the host computer 10 in the preparing sequence (alternatively, a sequence inverting this sequence by the above-mentioned inverse interleaving processing) of the pixel data. It is not necessary to send the data of the coordinates positions (r, θ) of the pixels. When the drawing position reaches the writing ending radial position R2 designated by the information, the drawing operation is ended. When the drawing operation is ended, the host computer 10 and the CD-R drive 12 end the controlling operation.

Figure 11:
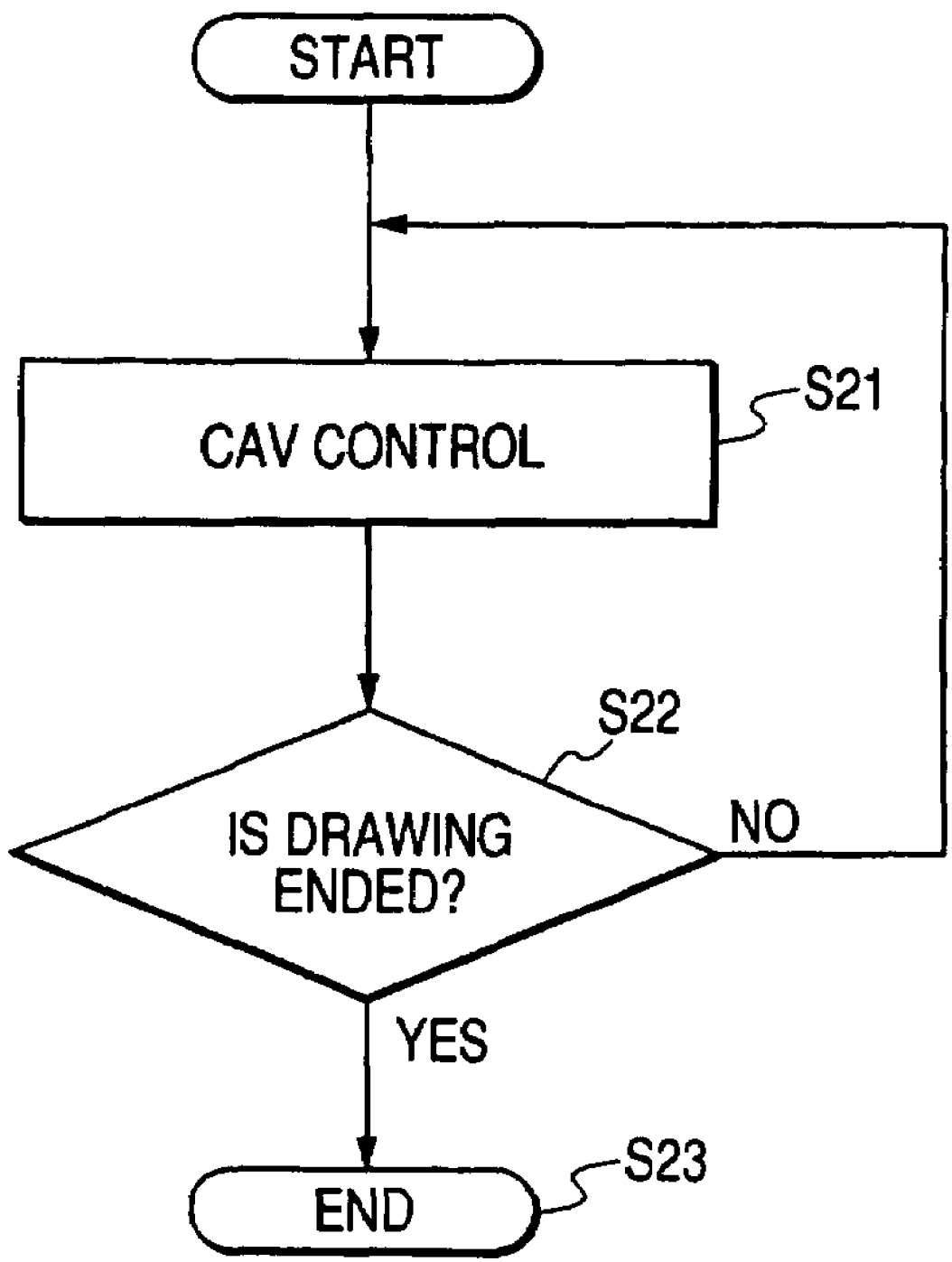
FIG. 11 is a flowchart illustrating a controlling operation of a spindle motor 30 of the CD-R drive 12 of FIG. 4 at the time of drawing.

The controlling in drawing executed by the drawing program loaded on the system control unit 56 (FIG. 4) of the CD-R drive 12 will be described with reference to FIGS. 11 and 12. FIG. 11 illustrates the control of the spindle motor 30. The system control unit 56 performs a CAV controlling operation of the spindle motor 30 with the number of spindle rotations (see Table 1) designated by the drawing mode information on the basis of the drawing mode information selected by the operator transmitted to the CD-R drive 12 from the host computer 10 before starting the drawing operation (S21). The control is continuously performed until the drawing is ended (S22 and S23).

Figure 12:
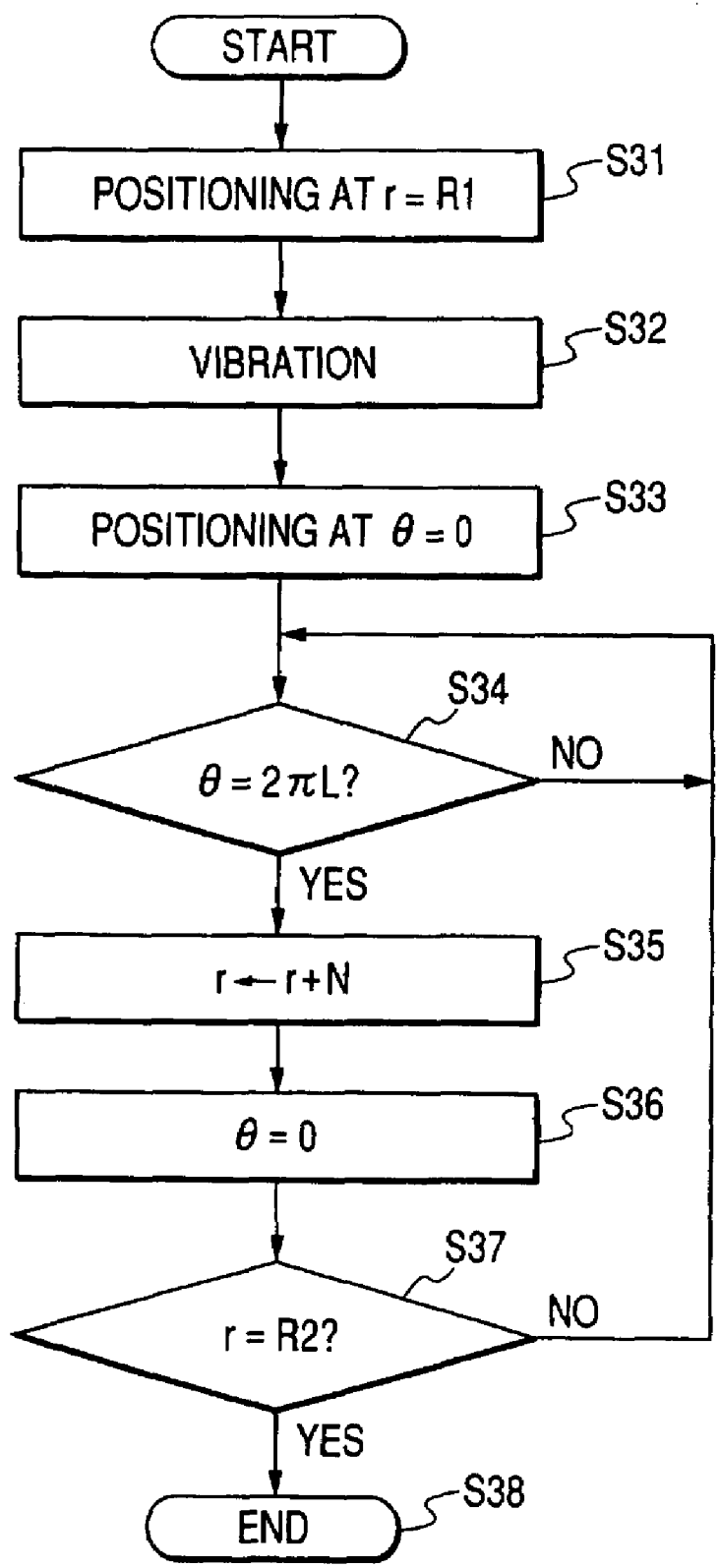
FIG. 12 is a flowchart illustrating a controlling operation of an optical pick-up 34 of the CD-R drive 12 of FIG. 4 at the time of drawing.

FIG. 12 illustrates the control of the optical pick-up 34. The system control unit 56 sets an optical axis position in a disc diameter direction of the objective lens 33 of the optical pick-up 34 to the writing starting radial position R1 at the inner periphery side of the disc before starting the drawing (S31). Next, the vibration signal is generated from the vibration signal generator 46, the generated vibration signal is transmitted t6 the tracking actuator of the optical pick-up 34, and the objective lens 33 is vibrated in the disc radial direction in a certain cycle (S32). A vibration frequency Hz is set to a value higher than the number rps of spindle rotations, thereby vibrating the objective lens 33 in one cycle or more per one spindle rotation. The vibration is continuously performed until the drawing is ended. The tracking servo is turned off at the time of drawing.

When the spindle motor 30 is stably CAV-controlled with the number of rotations designated by the drawing mode information (Step S22 of FIG. 11) and the optical axis position in the disc diameter direction of the objective lens 33 of the optical pick-up 34 is set to the writing starting radial position R1 (Step S31 of FIG. 12), the drawing is started from an arbitrary position in the circumferential direction. The position in the circumferential direction at which the drawing is started is set to θ=0 (S33). The circumferential position with respect to a position of θ=0 is detected every Δθ (the declination difference between the drawing pixels neighboring in the circumferential direction) described above by counting the clock prepared by dividing the same crystal oscillation clock as that used for the CAV controlling operation of the spindle motor 30. When θ=2π×L is reached, it is judged that the rotation operation is performed with the number of rotations designated by the number L of overwritings (S34). Accordingly, the optical axial position (a central position of the vibration) of the objective lens 33 is shifted in a direction toward the outer circumference of the disc by a distance N by driving the stepping motor 36 with one unit moving amount (S35). A counting value of θ returns to 0 by θ=2π×L (S36) and the counting of θ is just repeated. The movement of the distance N is performed at every θ=2π×L and when the position in the disc diameter direction reaches the writing ending radial position R2 (S37), the controlling operation is ended (S38).

As described above, instead of setting an arbitrary position in the circumferential direction at which the drawing operation is started to θ=0, a recognition code indicating a disc corresponding to the drawing on the label surface is formed at an inner side of the drawing area on the label surface of the CD-R disc 14, the position of the recognition code in the circumferential direction in which fixed data exists is detected by the optical pick-up 34 before drawing, and the position is set to θ=0. Accordingly, the drawing operation may be started from this position in the circumferential direction. By this configuration, even though the drawing operation is stopped in the middle of the drawing operation and the CD-R disc 14 is taken out and reloaded on the CD-R drive 12 after, the position of θ=0 is not changed. Accordingly, it is possible to continuously perform a writing operation of the drawing.

The encoder 52 (FIG. 4) uses the clock prepared by dividing the same crystal oscillation clock as that used for the CAV controlling operation of the spindle motor 30 and detection of the optical axis position in the disc diameter direction of the objective lens 33 of the optical pick-up 34 and encodes the drawing image data in the sequence (alternatively, the sequence returning to the original preparing sequence by inverting this sequence by the interleaving processing described above) of the pixel data transmitted from the host computer 10 at the encoding velocity (the encoding clock frequency (=4.3218 Mbits)×the encoding velocity magnification) designated by the drawing mode one by one, thereby generating a drawing signal (the NRZI segment signal WEN of FIG. 7) of which the duty is changed in accordance with the contrast data constituting the pixel data sequentially.

The drawing is realized by driving the laser diode 70 (FIG. 6) of the optical pick-up 34 with the drawing signal (the NRZI segment signal WEN of FIG. 7) encoded sequentially and by modulating the laser beam 35. In other words, when the position in the disc circumferential direction at which the drawing operation is started is set to θ=0 (Step S33 of FIG. 12) and the optical axis position (the central position of the vibration) of the objective lens 33 of the optical pick-up 34 is set to an arbitrary position (r, θ) on the CD-R disc 14, the optical axis positions (the central positions of the vibration) in the disc circumferential direction and the disc diameter direction of the objective lens 33 are synchronized with the encoding operation of the encoder 52 so that the drawing operation is performed by the laser beam 35 modulated by the NRZI segment signal WEN generated on the basis of the pixel data at the corresponding position (r, θ). Since the CAV control of the spindle motor 30 and the encoding processing performed by the encoder 52 are performed on the basis of the same crystal oscillation clock, the synchronization is easily realized.

Figure 13:
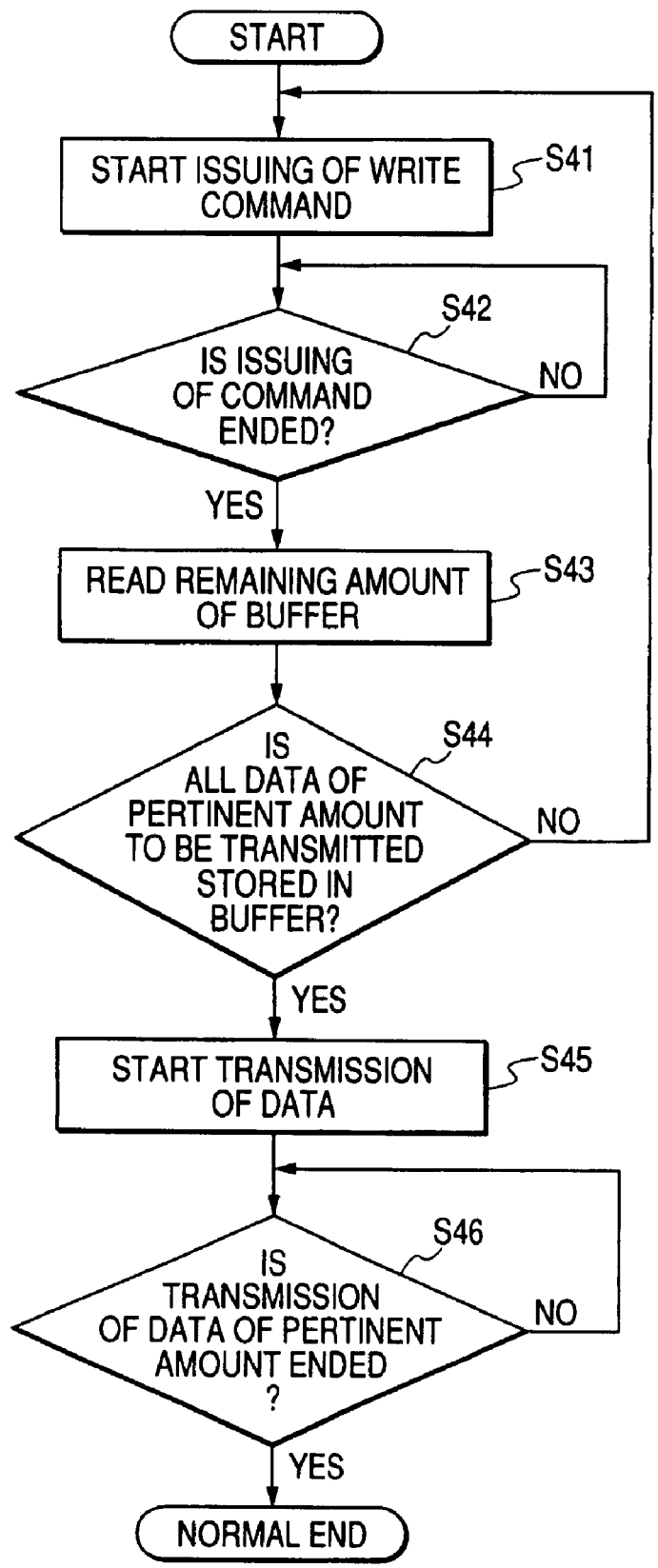
FIG. 13 is a flowchart illustrating a specific data transmission processing of Steps S4 and S6 in the flowchart of FIG. 1.

FIG. 13 specifically illustrates one-time (the pertinent data amount in accordance with the predetermined rule) transmission control (Steps S4 and S6 of FIG. 1) of the drawing image data performed by the host computer 10 at the time of drawing. The transmission control is performed by issuing a WRITE command from the host computer (S41 and S42), reading the remaining amount (the capacity of a vacant space) of the buffer memory 60 (FIG. 4) of the CD-R drive 12 (S43), examines whether or not the entire drawing image data of the pertinent data amount (for example, a constant amount) to be transmitted can be stored in the buffer memory 60 (S44), reading the drawing image data of the pertinent data amount from the transmission data area 78A of the buffer memory 78 (FIG. 8) of the host computer 10 when it is verified that the entire drawing image data can stored in the buffer memory 60, transmitting the drawing image data to CD-R drive 12 through the data transmission control unit 80 (FIG. 8), and storing the drawing image data in the buffer memory 60 (S45 and S46). Here, the buffer memory 60 is constituted by the ring buffer. When reading the remaining amount of the buffer memory 60 in Step S43, An area where the data already used for the drawing operation is stored after starting the drawing operation and to an area where the data is not stored at the time of starting the transmission are counted as the remaining amount out of the total capacity storing the drawing image data of the buffer memory 60.

Amount for one-time transmission to the CD-R drive 12 from the host computer 10 is the integer number of pixels and may include a data amount per one rotation, a data amount evenly dividing the data amount per one rotation, a data amount unevenly dividing the data amount per one rotation, and a data amount integer-multiplexing the data amount per one rotation. For example, as described in an example to be described later, assuming that the data amount per one rotation is set to 45 sectors, the respective data amount per one rotation can be transmitted in a sequence of 45 sectors, 45 sectors, 45 sectors, and the like. When the number of divisions is set to 3, the respective data amount evenly dividing the data amount per one rotation can be transmitted in a sequence of 15 sectors, 15 sectors, 15 sectors, and the like. When the data amount per one rotation is unevenly divided into 20 sectors, 20 sectors, and 5 sectors, the data amount unevenly dividing the data amount per one rotation can be transmitted in a sequence of 20 sectors, 20 sectors, 5 sectors, 20 sectors, 20 sectors, 5 sectors, and the like. When a multiple is set to 2, the respective data amount integer-multiplexing the data amount per one rotation can be transmitted in a sequence of 90 sectors, 90 sectors, 90 sectors, and the like. When the multiple is equal to the number L of overwritings, the respective data amount of the drawing image data used as one position in the diameter direction are transmitted.

Figure 14:
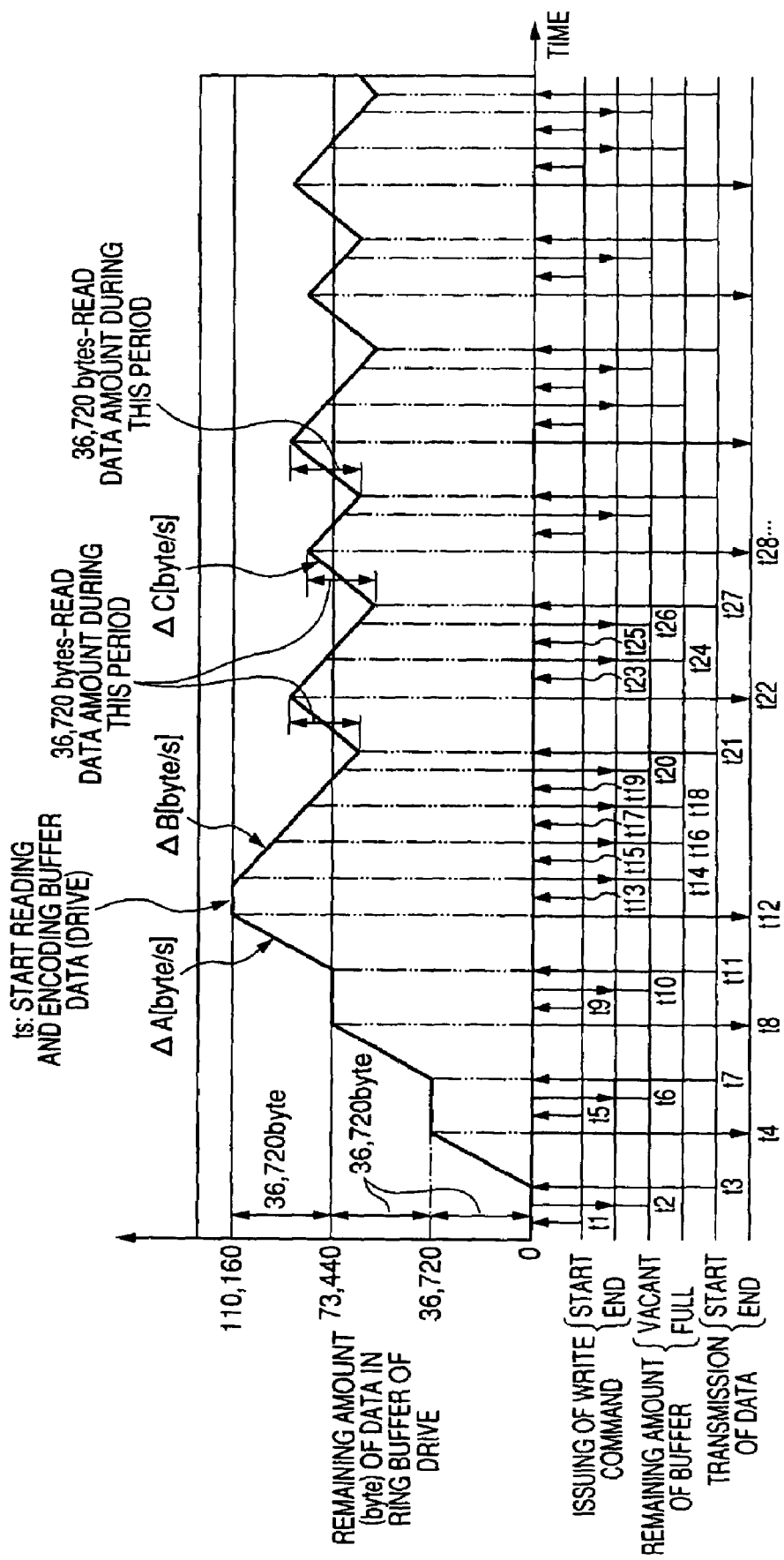
FIG. 14 is a time chart illustrating an operation performed by the data transmission processing of FIG. 13.

FIG. 14 illustrates an example of a transmission operation repeatedly performed in accordance with the transmission control of FIG. 13. A broken line of FIG. 14 shows a change in data amount of the drawing standby image data of the buffer memory 60 after the transmission is started from a state where the drawing image data is not stored (that is, the buffer memory 60 is vacant) in the buffer memory 60. In this transmission operation, when the drawing image data is stored in the total capacity storing the drawing image data in the buffer memory 60 after the starting of the drawing operation is instructed, the drawing operation is started and every time the remaining amount of the buffer memory 60 increases to a predetermined value or more (not less than the pertinent data amount transmitted in one-time transmission), the drawing image data of the following pertinent data amount is transmitted. The pertinent data amount of the data is intermittently transmitted to the buffer memory 60, but the reading of the image data from the buffer memory 60, the encoding of the read image data in the encoder 52, and the drawing by the encoded image data are successively performed at a constant speed.

The size (the total capacity storing buffer data) of a buffer of the buffer memory 60 (the ring buffer) is about 2 to 8 Mbytes in an actual apparatus, but the same buffer size is here set to 110,160 bytes. In FIG. 14, amount for one-time transmission is constantly set to 36,720 bytes. When being converted into sectors, the transmission amount is:

$$36{,}720 \text{ (bytes)}/2{,}448 \text{ (bytes)} = 15 \text{ (sectors)}$$

where the number of bytes per one sector is set to 2,448.

When the encoding velocity is set to 45 times the CD specification and the number of spindle rotations is set to 75 rps, as the drawing condition, the number of pixels per one rotation is 4,410 as shown in Mode 2 of Table 1. One pixel data is constituted by 24 bytes. The required number of sectors per one rotation is:

$$4{,}410 \text{ (pixels)} \times 24 \text{ (bytes)}/2{,}352 \text{ (bytes)} = 45 \text{ (sectors)}$$

where the effective data amount as the pixel is 2,352 bytes out of 2,448 bytes corresponding to one sector. Accordingly, in this case, amount for one-time transmission of 36,720 bytes (15 sectors) is the image data for ⅓ circumference.

A data transmission mode of the drawing image data to the CD-R drive 12 from the host computer 10 here employs Ultra DMA transmission Mode 0. In this mode, 16.6 Mbytes/second is set as the standard of the maximum transmission rate. The increasing velocity ΔA of the drawing standby image data of the buffer memory 60 during the only transmission to the buffer memory 60 is performed and the reading from the buffer memory 60 is not yet performed at the time when the transmission to the buffer memory 60 is started at first is the transmission velocity to the buffer memory 60 and is $$\Delta A = 1{,}024 \times 1{,}024 \times 16.6 \approx 17{,}406{,}362 \text{ bytes/second}.$$

The decreasing velocity ΔB of the drawing standby image data of the buffer memory 60 during the reading from the buffer memory 60 is performed and the transmission to the buffer memory 60 is not performed after the reading from the buffer memory 60 is started is the reading velocity from the buffer memory 60 and is $$\Delta B = 2{,}448 \times 75 \times 45 = 8{,}262{,}000 \text{ bytes/second}$$

where the encoding velocity magnification (=the reading velocity magnification of the buffer memory 60) in the encoder 52 (FIG. 4) of the CD-R drive 12 is set to 45 times the CD specification (drawing mode 2 of Table 1) and 1 sector is constituted by 2,448. The increasing velocity ΔC of the drawing standby image data of the buffer memory 60 during the reading from the buffer memory 60 is performed and the transmission to the buffer memory 60 is performed is a difference of ΔA and ΔB. Accordingly, the increasing velocity ΔC is $$\Delta C = 17{,}406{,}362 - 8{,}262{,}000 = 9{,}144{,}362 \text{ bytes/second.}$$

The operation shown in FIG. 14 will be described. Here, when the remaining amount of the buffer memory 60 is 36,720 bytes or more (that is, when the data amount of the drawing standby image data of the buffer memory 60 is less than 73,440 bytes), it is judged that the buffer memory 60 is vacant. When the drawing is instructed if the buffer memory 60 is vacant, the issuing of the WRITE command is started at a time t1 and when the issuing of the same command is ended at a time t2, the remaining amount of the buffer memory 60 is read. As the result, since it is judged that the buffer memory 60 is vacant, the first drawing image data of a certain amount (36,720 bytes) is transmitted from the host computer 10 to the CD-R drive 12 and is stored in the buffer memory 60 at a time t3. When the transmission is ended at a time t4, the issuing of the WRITE command is started again at a time t5 and when the issuing of the same command is ended at a time t6, the remaining amount of the buffer memory 60 is read again. As the result, since it is judged again that the buffer memory 60 is vacant, the next drawing image data of the certain amount (36,720 bytes) is transmitted from the host computer 10 to the CD-R drive 12 and is stored in the buffer memory 60 at a time t7. When the transmission of the drawing image data is repeated again from the time when the issuing of the WRITE command is started (at a time t8 to a time t12), the buffer memory 60 is completely full. Then, the drawing image data is read from the buffer memory 60, the read drawing image data is encoded, and the drawing operation is started by the encoded drawing image data at a time ts. The reading of the drawing image data from the buffer memory 60 is successively performed in the sequence of the data stored in the buffer memory 60 at a constant velocity until the drawing operation is ended.

Even after the buffer memory 60 is full at the time t12, the WRITE command is periodically issued until it is judged that the buffer memory 60 is vacant, thereby reading the remaining amount of the buffer memory 60 (at a time t13 to a time t20). When it is judged that the buffer memory 60 is vacant at the time t20, the next drawing image data of the certain amount (36,720 bytes) is transmitted from the host computer 10 to the CD-R drive 12 at a time t21 and the drawing image data of the buffer memory 60 constituted by the ring buffer in which the drawing operation is ended is updated into the newly transmitted drawing image data in an old sequence (that is, in a storing sequence). When the transmission of the drawing image data of the certain amount is ended at a time t22, the WRITE command is periodically issued until it is judged that the buffer memory 60 is vacant, thereby reading the remaining amount of the buffer memory 60. Every time it is judged that the buffer memory is vacant at the time t20, the next drawing image data of the certain amount (36,720 bytes) is transmitted from the host computer 10 to the CD-R drive 12 and the drawing image data of the buffer memory 60 constituted by the ring buffer in which the drawing operation is ended is updated into the newly transmitted drawing image data sequentially in the old sequence (that is, in the storing sequence) (at times t23, t24, t25, and the like). This operation is repeated until the drawing operation for the CD-R disc 14 is ended. By this configuration, the drawing image data is intermittently transmitted from the host computer 10 to the CD-R drive 12 with a certain data amount.

A display control of a drawing progress at the time of drawing will be described. In FIG. 1, when the drawing image data is transmitted from the host computer 10 to the CD-R drive 12 (S4 and S6), the unit 82 (FIG. 8) of the host computer 10 for counting the total amount of the data of which the transmission is ended counts (accumulates) the total data amount Dall of the image data of which the transmission from the host computer 10 to the CD-R drive 12 until now from the time when the drawing operation is started (S5). Every time the transmission of the drawing image data of the certain amount is ended (S6), a current drawing position calculating unit 84 (FIG. 8) of the host computer 10 calculates the currently drawing position R2' in the disc diameter direction by Equation (3) on the basis of the total amount Dall of the data of which the transmission is ended, the drawing condition parameter data R1 (the drawing starting disc radial position), N (the unit moving distance in the disc radial direction of the optical pick-up 34), M (the data amount of the drawing image per one rotation of the disc), and L (the number of overwritings at the same radial position of the optical pick-up 34) (S7):

$$R2' = R1 + ((Dall \cdot N)/(M \cdot L)) \quad (3)$$

The display control unit 86 (FIG. 8) of the host computer 10 reads the image data stored in the display data area 78B of the buffer memory 78 before starting the drawing operation and prepares a video signal of the entire image of a radial area (an area between the drawing starting radial position R1 and the drawing ending radial position R2) designated out of the entire image of the image data by the operator to display the video signal on the display 11 as the preview image. The drawing preview image is displayed on the display 11 so that the position R2' in the disc diameter direction of the currently drawing disc calculated can be visually recognized during performing the drawing. This display is updated (S8) every time the transmission of the drawing image data of a pertinent data amount is ended (S6) and the currently drawing position R2' in the disc diameter direction is calculated (S7). Since amount for one-time transmission of the drawing image data is comparatively small and the display of the content corresponding to the total amount Dall of the data of which the transmission has been ended until now is updated every time one-time transmission is ended, the currently drawing position R2' in the disc diameter direction recognized on the screen of the display 11 correctly corresponds to a currently drawing actual position in the disc diameter direction. For example, assuming that the unit moving distance in the disc radial direction of the optical pick-up 34 is set to 10 μm and amount for one-time transmission corresponds to data amount (that is, M×L bytes) in one unit moving distance N, the display is updated whenever the drawing is progressed in the unit moving distance (10 μm) in the diameter direction and very correct consistent progress is displayed at the currently drawing actual position in the diameter direction. Assuming that a unit moving distance in the disc radial direction of the optical pick-up 34 is set to 10 μm similarly and one transmission amount of the drawing image data corresponding to data amount (that is, M×L×10 bytes) in a 10 unit moving distance 10N, the display is updated every time the drawing is progressed in a unit moving distance (100 μm) in the diameter direction. Since 100 μm (=0.1 mm) is a very short distance, the display of a correctly consistent progress is performed at the currently drawing actual position in the diameter direction. By this configuration, the operator can know the drawing progress (that is, to which part of the drawing image is drawn) at the time of drawing in real time.

When the drawing is progressed and the position R2' in the disc diameter direction reaches the outermost periphery of the drawing preview image on the screen of the display 11, and the drawing preview image is not changed, a user can judge whether the drawing operation is completed. When the position R2' is not shifted before the position R2' in the disc diameter direction reaches the outermost position R2 of the drawing preview image on the screen of the display 11, occurrence of an error around the position R2' in the disc diameter direction where the position R2' is not shifted can be found, whereby the cause of the error may be easily analyzed. When the CD-R drive 12 allows the drawing processing to be stopped by the operator's active stopping operation in the middle of the drawing operation, the user can stop the drawing processing by performing the stopping operation at a pertinent radial position after checking the drawing progress on the screen of the display 11.

Figure 15:
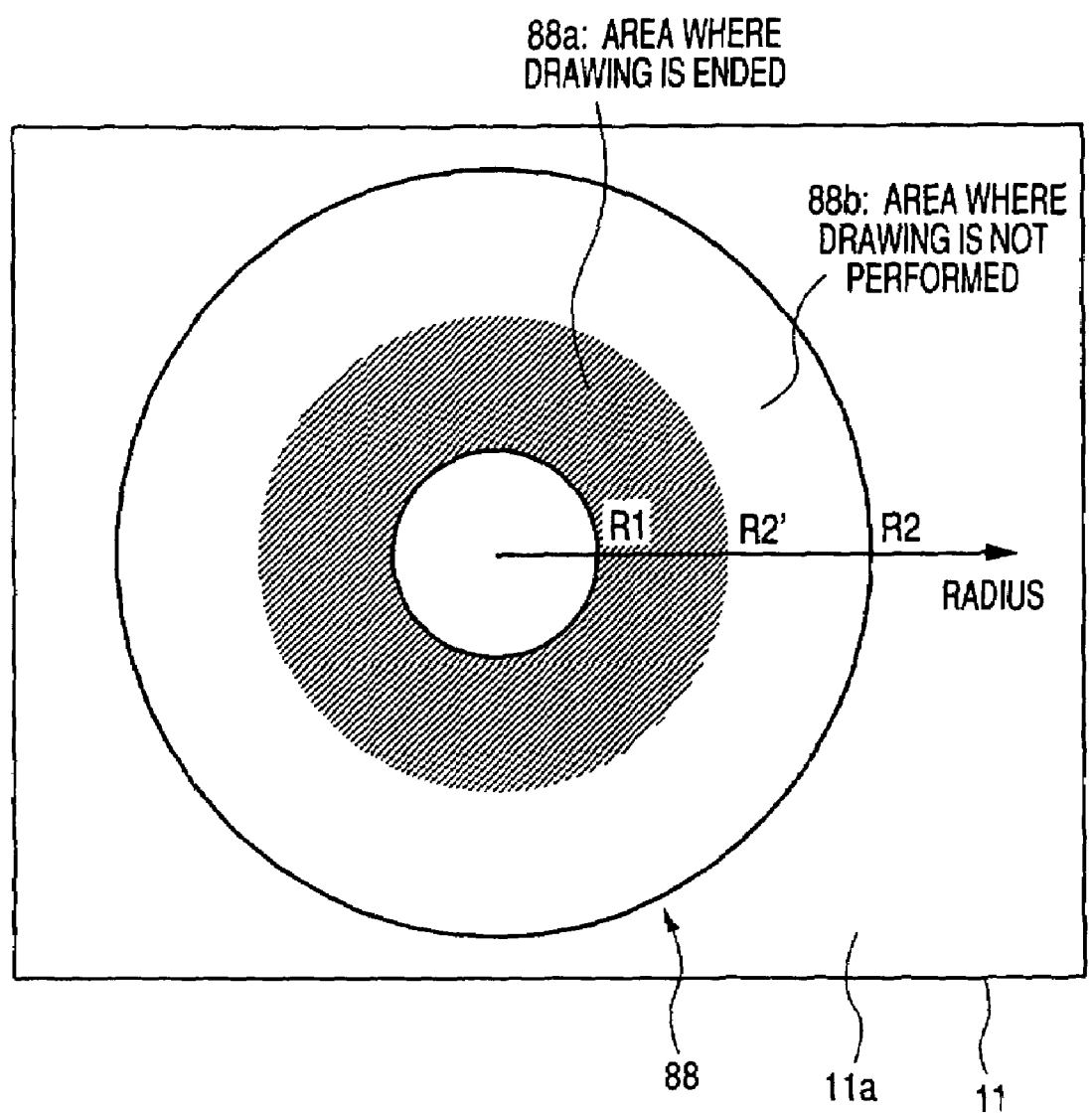
FIG. 15 is a diagram illustrating an example of a method of displaying a currently drawing position in a disc diameter direction so as to be visually recognizable on a display at the time of drawing.

A method shown in FIG. 15 is used as the method of display the drawing preview image on the display 11 so that the currently drawing position R2' in the disc diameter direction calculated can be visually recognized during performing the drawing operation. This display method is the method of displaying a preview image 88 drawn on a screen 11a of the display 11 and varying display aspects such as brightness, contrast, and coloring in an inner periphery area 88a where the drawing is ended and an outer periphery area 88b where the drawing is not performed along the currently drawing position R2' in the disc diameter direction. When the position R2' can be recognized with brightness, the entire preview image is displayed dark before starting the drawing operation, the area 88b where the drawing is not performed is just displayed dark, and the area 88a where the drawing is ended is displayed bright. When the position R2' can be recognized with contrast, the entire preview image is displayed in low contrast before starting the drawing operation, the area 88b where the drawing is not performed is just displayed in low contrast during performing the drawing, and the area 88a where the drawing is ended is displayed in high contrast. When the position R2' can be recognized in coloring, the entire preview image is displayed in an achromatic color before starting the drawing operation, the area 88b where the drawing is not performed is just displayed in the achromatic color during performing the drawing, and the area 88a where the drawing is ended is displayed in a chromatic color.

FIG. 16 illustrates an actual display example in which the position R2' can be recognized in contrast. In other words, (i) represents a state before the drawing operation is started. In (i), the entire preview image from the drawing starting radial position R1 to the drawing ending radial position R2 is the area 88b where the drawing is not performed and is displayed in low contrast. (ii) represents a state where the drawing is progressed to about 20%. In (ii), the inner periphery area 88a where the drawing is ended is displayed in high contrast and the outer periphery area 88b where the drawing is not performed is displayed in high contrast along the currently drawing position R2' in the disc diameter direction. (iii) represents a state where the drawing is progressed in about 75%. In (iii), the area 88a where the drawing is ended is expanded and the area 88b where the drawing is not performed is reduced with the shift of the currently drawing position R2' in the disc diameter direction in the outer periphery direction further than the position R2' in (ii). (v) represents a state where the drawing is ended up to the drawing ending radial position R2. In (v), the entire preview image from the drawing starting radial position R1 to the drawing ending radial position R2 is the area 88b where the drawing is ended and is displayed in high contrast. By the display described above, the operator can know the drawing progress in real time at each point of time during performing the drawing.

Figure 17:
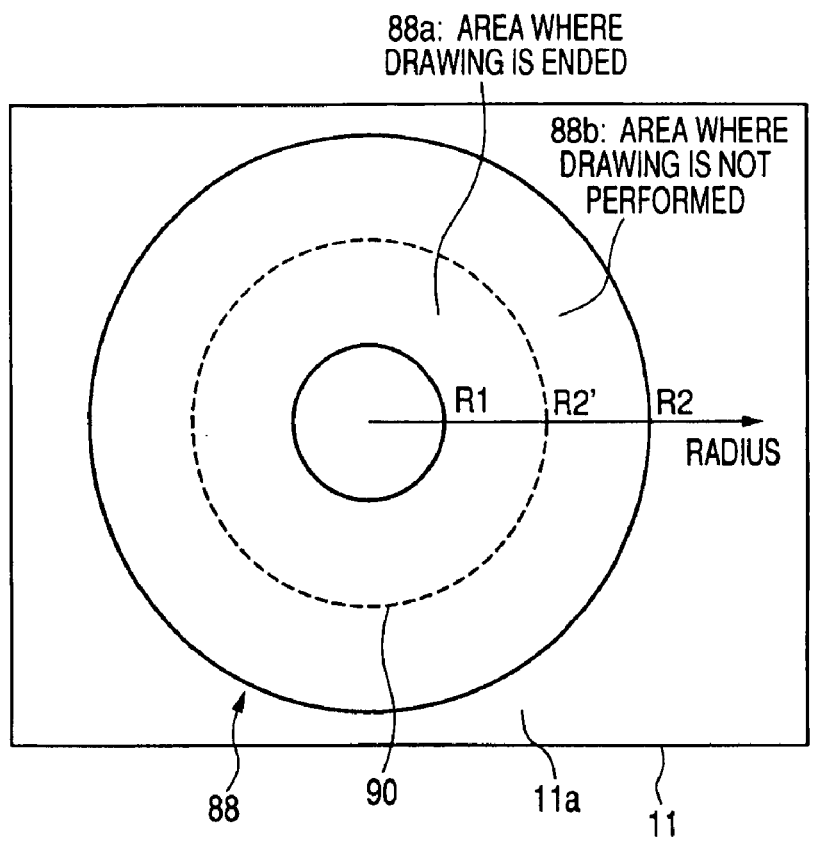
FIG. 17 is a diagram illustrating another example of the method of displaying the currently drawing position in the disc diameter direction so as to be visually recognizable on the display at the time of drawing.

FIG. 17 illustrates another method of the drawing preview image on the display 11 during performing the drawing so that the currently drawing position R2' in the disc diameter direction calculated can be visually recognized. The method displays the currently drawing position R2' in the with a dot-line command ring 90. In the preview image 88, the inner periphery side thereof represents the area 88a where the drawing is ended and the outer periphery side thereof represents the area 88b where the drawing is not performed along the command ring 90. The entire preview image 88 is displayed in the achromatic color and the command ring 90 is displayed in the chromatic color, whereby the command ring 90 can be visually recognized.

Figure 18:
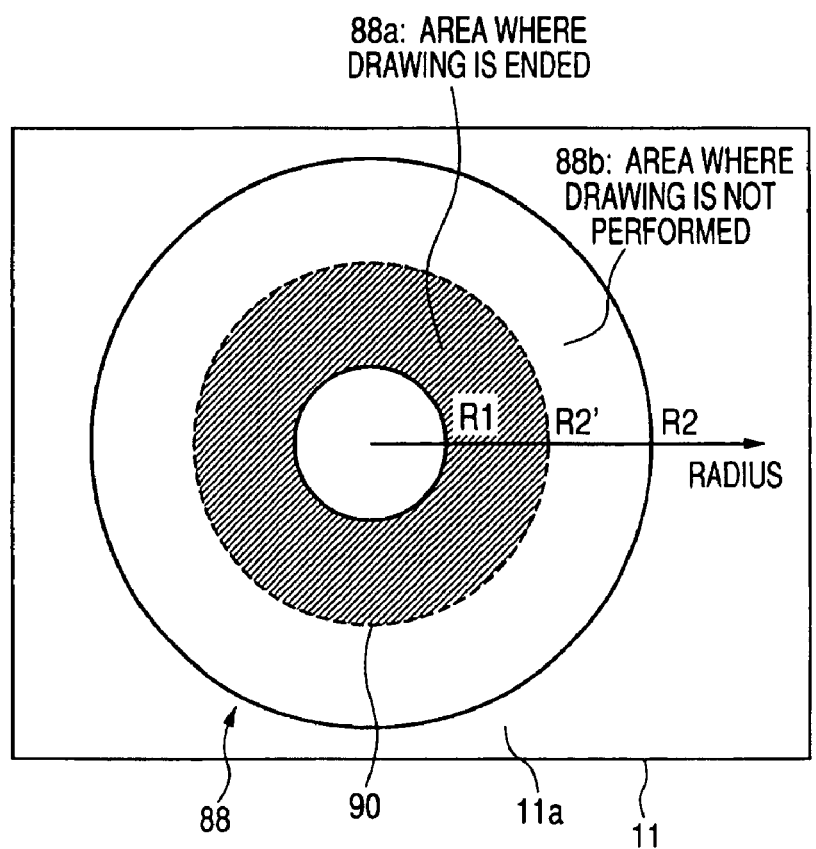
FIG. 18 is a diagram illustrating a further example of the method of displaying the currently drawing position in the disc diameter direction so as to be visually recognizable on the display at the time of drawing.

FIG. 18 illustrates a further method of the drawing preview image on the display 11 during performing the drawing so that the currently drawing position R2' in the disc diameter direction calculated can be visually recognized. This method jointly uses the display method of FIG. 15 and the display method of FIG. 17. In other words, in the preview image 88, the currently drawing position R2' in the disc diameter direction is displayed with the thin-line command ring 90 and display aspects (brightness, contrast, and coloring) are varied in the inner periphery area 88a where the drawing is ended and the outer periphery area 88b where the drawing is not performed along the command ring 90.

In the embodiment, the remaining amount of the buffer memory 60 of the CD-R drive 12 is monitored and it is detected that the remaining amount of the buffer memory 60 increases to not less than a predetermined value (not less than a pertinent data amount transmitted at one-time transmission), and the next image data of a pertinent data amount is transmitted from the host computer 10 to the CD-R drive 12. But instead of monitoring the remaining amount of the buffer memory 60, the data amount of the drawing standby image data stored in the buffer memory 60 may be monitored, it may be detected that the data amount of the drawing standby image data decreases to not more than the predetermined value (not more than the pertinent data amount transmitted at one-time transmission), and the next image data of the pertinent data amount can be transmitted from the host computer 10 to the CD-R drive 12.

In the embodiment, every time the image data is transmitted from the host computer 10 to the CD-R drive 12, the display of the currently drawing position R2' in the disc diameter direction is updated. But the display of the position R2' may be updated once every time the transmission of the image data is performed at plural times.

In the embodiment, the drawing is progressed from the inner periphery side to the outer periphery side of the disc, but on the contrary, the drawing may be progressed from the outer periphery side to the inner periphery side of the disc. In this case, the drawing starting radial position R1 is located at the outer periphery side of the disc and the drawing ending radial position R2 is located at the inner periphery side of the disc.

Instead of Equation (3), the currently drawing position R2' in the disc diameter direction can be calculated by the following Equation (3'):

$$R2'=R1-((\text{Dall}-N)/(M-L)) \quad (3')$$

In the embodiment, a case where the drawing is performed on the drawing layer 24 by using the CD-R disc 14 is described, but the invention can be applied to even a case where the drawing is performed on the data recording layer by using the known CD-R disc.

In the embodiment, the invention is applied to the CD recording and reproducing system, but the invention can be applied to other optical disc systems such as a DVD recording and reproducing system.

What is claimed is:

1. An optical disc image drawing method comprising:
   providing an optical disc image drawing apparatus, a computer, a display, and an optical disc in which a visible image can be drawn onto a surface thereof;
   loading the optical disc onto the optical disc image drawing apparatus;
   transmitting image data of the visible image to be drawn on the optical disc from the computer to the optical disk image drawing apparatus, sequentially;
   while the optical disk image drawing apparatus receives the image data transmitted from the computer, rotating the optical disc by the optical disk image drawing apparatus, moving an optical head in a disc diameter direction, modulating a laser beam to be output from the optical head in accordance with the received image data, and irradiating the modulated laser beam onto the optical disc to draw the visible image corresponding to the image data, sequentially;
   acquiring the total amount of the transmitted data and calculating a position corresponding to the acquired total data amount in the disc diameter direction at which a drawing operation is currently performed while the computer transmits the image data to the optical disc image drawing apparatus, sequentially; and
   displaying a picture of the entire drawing image on the display so that the calculated position at which the drawing operation is currently performed can be visually recognized, sequentially.

2. The method according to claim 1, wherein
   the computer intermittently transmits the image data in a pertinent data amount to the optical disc image drawing apparatus,
   the optical disc image drawing apparatus stores the image data intermittently transmitted in a buffer memory and reads the stored image data so as to perform the drawing operation, and
   the computer monitors a remaining amount of the buffer memory or a data amount of drawing standby image data stored in the buffer memory and transmits following image data of the pertinent data amount to the optical disc image drawing apparatus according to the detection that the remaining amount of the buffer memory increases to a predetermined value or more or the data amount of the drawing standby image data decreases to a predetermined value or less.

3. The method according to claim 2, wherein the buffer memory comprises a ring buffer and the image data stored in the buffer memory of which the drawing operation is ended is updated into the image data transmitted from the computer, sequentially.

4. The method according to claim 1, wherein
   the computer intermittently transmits the image data in a pertinent data amount to the optical disc image drawing apparatus so that a transmission speed at which the image data is transmitted to the optical disc image drawing apparatus from the computer is faster than a speed at which the optical disc image drawing apparatus draws the image corresponding to the transmitted image data,
   the optical disc image drawing apparatus temporally stores the intermittently transmitted image data in a buffer memory and successively reads the stored image data so as to perform the drawing operation, and
   the computer monitors a remaining amount of the buffer memory or a data amount of drawing standby image data stored in the buffer memory and transmits following image data of the pertinent data amount to the optical disc image drawing apparatus according to the detection that the remaining amount of the buffer memory increases to a predetermined value or more or the data amount of the drawing standby image data decreases to a predetermined value or less.

5. The method according to claim 4, wherein the amount of the image data transmitted to the optical disc image drawing apparatus from the computer by one-time transmission or successive predetermined plural times of transmissions is constant.

6. The method according to claim 4, wherein the buffer memory comprises a ring buffer and the image data stored in the buffer memory of which the drawing operation is ended is updated into the image data transmitted from the computer, sequentially.

7. The method according to claim 1, wherein a method of displaying the picture of the entire drawing image onto the display so that the calculated position at which the drawing operation is currently performed can be visually recognized includes one of a method of varying display aspects in an inner periphery area and an outer periphery area along the currently drawing position in the disc diameter direction, a method of displaying a mark indicating the currently drawing position in the disc diameter direction, or a method of jointly using the both methods.

8. The method according to claim 1, wherein
   to perform the displaying operation,
   a currently drawing position R2' in the disc diameter direction at the time of performing the drawing operation from an inner periphery side to an outer periphery side of the disc is calculated by calculating the following equation:

$$R2'=R1+((\text{Dall}\cdot N)/(M\cdot L)), \text{ and}$$

the currently drawing position R2' in the disc diameter direction at the time of performing the drawing operation from the outer periphery side to the inner periphery side of the disc is calculated by calculating the following equation:

$$R2'=R1-((\text{Dall}\cdot N)/(M\cdot L))$$

where Dall represents the total amount of the image data transmitted to the optical disc image drawing apparatus from the computer,
   R1 represents a disc radial position at which the drawing operation is started,
   M represents the data amount of the drawing image per one rotation of the disc,
   N represents a unit moving distance in the disc radial direction of the optical head, and L represents the number of overwritings at the same radial position of the optical head.

9. A computer readable recording medium storing an optical disc image drawing program executed by a computer communicatable with an optical disk image drawing apparatus that loads an optical disc in which a visible image can be drawn onto a surface thereof, rotates the optical disc, moves an optical head in a disc diameter direction, modulates a laser beam to be output from the optical head in accordance with image data received from the computer, and irradiates the modulated laser beam onto the optical disc to draw the visible image corresponding to the image data, sequentially, the optical disc image drawing program causing the computer to executes the steps of:

transmitting the image data of the visible image to be drawn on the optical disc to the optical disk image drawing apparatus, sequentially;

acquiring the total amount of the transmitted data and calculating a position corresponding to the acquired total data amount in the disc diameter direction at which a drawing operation is currently performed while the computer transmits the image data to the optical disc image drawing apparatus, sequentially; and displaying a picture of the entire drawing image on a display so that the calculated position at which the drawing operation is currently performed can be visually recognized, sequentially.

10. An optical disc image drawing system, comprising:

an optical disc image drawing apparatus that loads an optical disc on which a drawing operation can be performed on a surface thereof, rotates the optical disc, moves an optical head in a disc diameter direction, modulates a laser beam to be output from the optical head in accordance with image data received from the computer, and irradiates the modulated laser beam onto the optical disc to draw the visible image corresponding to the image data;

a computer that transmits the image data of the visible image to be drawn on the optical disc to the optical disk image drawing apparatus, acquires the total amount of the transmitted data and calculates a position corresponding to the acquired total data amount in the disc diameter direction at which a drawing operation is currently performed while the computer transmits the image data to the optical disc image drawing apparatus, sequentially; and a display displays a picture of the entire drawing image thereon so that the calculated position at which the drawing operation is currently performed can be visually recognized, sequentially.

* * * * *